(12) United States Patent
Zha et al.

(10) Patent No.: US 12,069,392 B2
(45) Date of Patent: Aug. 20, 2024

(54) IMAGE SENSOR, IMAGE OUTPUT METHOD AND APPLICATION THEREOF

(71) Applicant: Shenzhen Ruishizhixin Technology Co., Ltd., Guangdong (CN)

(72) Inventors: Yingyun Zha, Shenzhen (CN); Jian Deng, Shenzhen (CN)

(73) Assignee: Shenzhen Ruishizhixin Technology Co., Ltd., Shenzhen (CN)

( * ) Notice: Subject to any disclaimer, the term of this patent is extended or adjusted under 35 U.S.C. 154(b) by 39 days.

(21) Appl. No.: 18/058,743

(22) Filed: Nov. 24, 2022

(65) Prior Publication Data

US 2023/0297158 A1 Sep. 21, 2023

Related U.S. Application Data

(63) Continuation of application No. PCT/CN2022/104987, filed on Jul. 11, 2022.

(30) Foreign Application Priority Data

Mar. 15, 2022 (CN) .......................... 202210250010.5

(51) Int. Cl.
*H04N 25/779* (2023.01)
*H04N 25/77* (2023.01)

(52) U.S. Cl.
CPC ........... *H04N 25/779* (2023.01); *H04N 25/77* (2023.01)

(58) Field of Classification Search
CPC ...... H04N 25/779; H04N 25/77; H04N 25/47; H04N 25/707; H04N 25/70; H04N 25/75; H04N 25/76; H04N 25/78
See application file for complete search history.

(56) References Cited

U.S. PATENT DOCUMENTS

| | | | |
|---|---|---|---|
| 2020/0084403 A1* | 3/2020 | Suh | H04N 25/47 |
| 2020/0169675 A1* | 5/2020 | Stobie | H04N 5/33 |
| 2021/0084246 A1* | 3/2021 | Mostafalu | H04N 25/766 |

FOREIGN PATENT DOCUMENTS

| | | | |
|---|---|---|---|
| CN | 113727079 A | 11/2021 | |
| CN | 114051108 A | 2/2022 | |
| WO | WO-2022207466 A1 * | 10/2022 | H04N 25/40 |

\* cited by examiner

*Primary Examiner* — Twyler L Haskins
*Assistant Examiner* — John H Morehead, III

(57) ABSTRACT

Provided are an image sensor and an image output method and application thereof. The image sensor includes an input circuit, configured to perform a first photoelectric conversion on incident light to generate a photoelectric current in an EVS mode working period, and performs s second photoelectric conversion on the incident light to generate photoelectric charges in an APS mode working period; an EVS circuit configured to output a corresponding event signal according to a difference value between a first voltage corresponding to a photoelectric current and a reference voltage; an APS circuit configured to output a corresponding grayscale signal according to a second voltage corresponding to photoelectric charges; and a control circuit configured to output a corresponding APS image according to the grayscale signal and output a corresponding EVS image according to the event signal.

20 Claims, 10 Drawing Sheets

| | | | One Frame of APS Image | | | |
|---|---|---|---|---|---|---|
| A | EVS | APS | EVS | APS | EVS | |
| B | EVS | APS | EVS | APS | EVS | |
| C | EVS | APS | EVS | APS | EVS | |
| D | EVS | APS | EVS | APS | EVS | |

IMAGE SENSOR, IMAGE OUTPUT METHOD AND APPLICATION THEREOF

CROSS REFERENCE TO RELATED APPLICATIONS

The present application is a Continuation Application of PCT Application No. PCT/CN2022/104987 filed on Jul. 11, 2022, the contents of which are incorporated herein by reference in their entirety.

TECHNICAL FIELD

The present application relates to the technical field of image sensors, and more particularly, to an image sensor, an image output method and an application thereof.

BACKGROUND

In the related art, there is a solution that an Active Pixel Sensor (APS) is integrated with an Event-Based Vision Sensor (EVS): the photoelectric current generated by photodiodes in the EVS is replicated to form the APS, thereby achieving the integration of EVS and APS. However, this solution tends to introduce a large amount of noise during the replication of the photoelectric current, which seriously affects the imaging quality of the APS. In addition, during the image output process, it is impossible to output both APS images and EVS images via a single pixel at the same time. Moreover, both APS and EVS require photoelectric conversion devices for detecting light, which takes up most of the space of the image sensor, thus significantly increasing the size of the image sensor. It can be seen therefrom that there are many disadvantages of image sensors using the above-mentioned integration solution, such as large power consumption, large noise and large size.

Therefore, it is necessary to improve the structure of the traditional image sensor.

SUMMARY

The present application provides an image sensor, an image output method and an application thereof, which arms to solve the problems of larger size of the image sensor that realize the mutual integration of APS and EVS in related art, and the inability to realize the simultaneous output of APS images and EVS images via a single pixel.

In order to solve the above-mentioned technical problems, in the first aspect, an embodiment of the present application provides an image sensor comprising a pixel array comprising a plurality of pixels, wherein the pixel array is configured as two types of pixels comprising an Active Pixel Sensor (APS) pixel and an Event-Based Vision Sensor (EVS) pixel, the image sensor comprising an input circuit, an APS circuit, an EVS circuit and a control circuit;
  wherein each of the pixels comprises the APS circuit and the EVS circuit; the input circuit is connected to the APS circuit and the EVS circuit, and the control circuit is connected to the APS circuit and the EVS circuit;
  wherein a working period unit of the input circuit is a working period of outputting a frame of an APS image; the working period unit comprises an EVS mode working period and an APS mode working period, and the APS mode working period is provided between two adjacent EVS mode working periods;
  the input circuit is configured to perform a first photoelectric conversion on incident light to generate a corresponding photoelectric current during the EVS mode working period, and perform a second photoelectric conversion on the incident light to generate corresponding photoelectric charges during the APS mode working period;
  the EVS circuit is configured to output a corresponding event signal according to a difference between a first voltage corresponding to the photoelectric current and a reference voltage during a process of the first photoelectric conversion.
  the APS circuit is configured to output a corresponding grayscale signal according to a second voltage corresponding to the photoelectric charges during a subsequent process of the first photoelectric conversion; and
  the control circuit is configured to output a corresponding EVS image according to the event signal, and output a corresponding APS image according to the grayscale signal.

In the second aspect, an embodiment of the present application provides an image output method, applied to an image sensor having a pixel array comprising a plurality of pixels and comprising an input circuit, an APS circuit, an EVS circuit and a control circuit, wherein each pixel comprises the APS circuit and the EVS circuit; the input circuit is connected to the APS circuit and the EVS circuit, and the control circuit is connected to the APS circuit and the EVS circuit; wherein a working period unit of the input circuit is a working period of outputting one frame of APS image, the working period unit comprises an EVS mode working period and an APS mode working period, and the APS mode working period is provided between two adjacent EVS mode working periods;
  the image output method comprising:
  performing, by the input circuit, a first photoelectric conversion on incident light to generate a corresponding photoelectric current during the EVS mode working period, and performing, by the input circuit, a second photoelectric conversion on the incident light to generate corresponding photoelectric charges;
  outputting, by the EVS circuit, a corresponding event signal according to a difference between a first voltage corresponding to the photoelectric current and a reference voltage during a process of the first photoelectric conversion;
  outputting, by the APS circuit, a corresponding grayscale signal according to a second voltage corresponding to the photoelectric charges during the process of the first photoelectric conversion; and
  outputting, by the control circuit, a corresponding EVS image according to the event signal, and outputting, by the control circuit, a corresponding APS image according to the grayscale signal.

In the third aspect, an embodiment of the present application provides an application of the image sensor according to an embodiment of the present application in the first aspect in a photoelectric device.

It can be seen from the above-mentioned description that, compared with the related art, the present application has the following beneficial effects.

The image sensor comprises a pixel array consisting of a plurality of pixels, and the pixel array is configured as two types of pixels including an APS pixel and an EVS pixel. Specifically, the image sensor comprises four circuits, which are respectively an input circuit, an APS circuit, an EVS circuit and a control circuit. A working period unit of the input circuit comprises an EVS mode working period and an APS mode working period, and a single APS mode working period is provided between two adjacent EVS mode working periods. In the present application, the input circuit is configured to perform a first photoelectric conversion (i.e., EVS exposure) on incident light, and generate a corresponding photoelectric current for use by the EVS circuit to obtain a corresponding event signal during the EVS mode working period. The input circuit is further configured to perform a second photoelectric conversion (i.e., APS exposure) on the incident light during THE APS mode working period, and generate corresponding photoelectric charges for use by the APS circuit to obtain a corresponding grayscale signal. The control circuit is configured to output a corresponding APS image according to the grayscale signal, and output a corresponding EVS image according to the event signal. It can be seen therefrom that the APS pixel and the EVS pixel share the same input circuit and the same control circuit, that is, it is not necessary to separately provide an input circuit and a control circuit for the APS pixel and the EVS pixel, so that the size of the image sensor can be significantly reduced. Importantly, a single APS mode working period is provided between two adjacent EVS mode working periods, which means that a portion (i.e., APS mode working period) of the EVS exposure process is divided up to perform the APS exposure. Besides, during the subsequent process of the first photoelectric conversion (i.e., during a next first photoelectric conversion after completing the second photoelectric conversion, or in other words, during a next EVS mode working period adjacent to the APS mode working period), the APS circuit outputs a corresponding grayscale signal according to the second voltage corresponding to the photoelectric charges. Therefore, the readout of the APS does not affect exposure and readout of the EVS, so that multiple frames of EVS images can be output while outputting one frame of APS image. Hence, when a single pixel includes both an APS pixel and an EVS pixel, the single pixel can output an APS image and an EVS image at the same time, thereby truly realizing a mutual integration between the APS and the EVS.

BRIEF DESCRIPTION OF THE DRAWINGS

In order to illustrate the related art or the technical solutions in the embodiments of the present application more clearly, the drawings that are used in the description of the related art or the embodiments of the present application will be introduced briefly as follows. Obviously, the drawings in the following description are only some embodiments of the present invention, for those of ordinary skill in the art, other drawings may also be obtained based on the structures shown in these drawings without creative labor.

DETAILED DESCRIPTION

Figure 1:
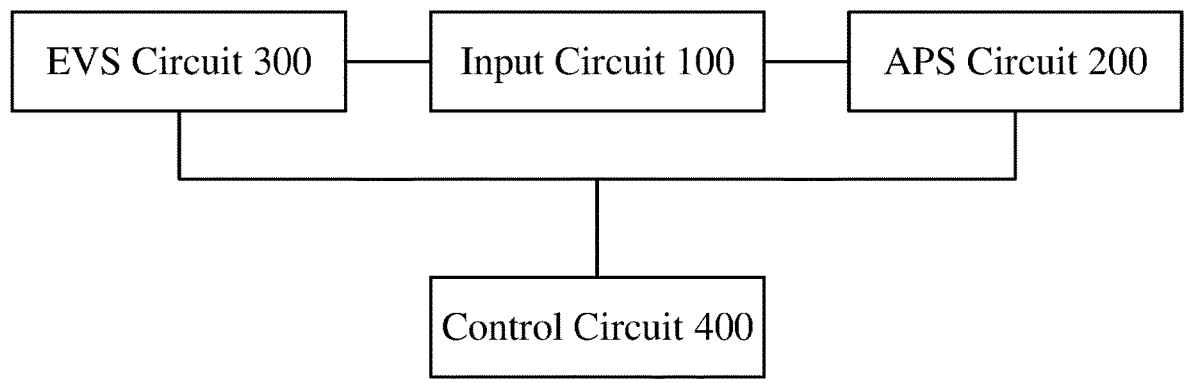
FIG. 1 is a block diagram of a first module of a pixel according to an embodiment of the present application.

In order to make the objectives, technical solutions, and advantages of the present application clearer and more comprehensible, the present application will be described clearly and completely with reference to embodiments of the present application and corresponding accompanying drawings, where the same or similar reference numerals indicate same or similar elements or elements having same or similar functions throughout. It should be understood that each embodiment of the present application described below is only configured to explain the present application, and is not intended to limit the present application. That is, based on each embodiment of the present application, all other embodiments obtained by those of ordinary skill in the art without creative efforts shall belong to the protection scope of the present application. In addition, technical features involved in various embodiments of the present application described below may be combined with each other as long as they do not conflict with each other.

An image sensor is an element for converting incident light on a photosensitive surface thereof into a corresponding electrical signal, and generally includes a complementary metal oxide semiconductor (CMOS) image sensor and a dynamic vision sensor (DVS). The CMOS image sensor is an Active Pixel Sensor (APS), and the DVS is an Event-based Vision Sensor (EVS). In recent years, the development of the APS is increasingly rapid, making the APS more and more widely applied in fields such as automotive electronics, intelligent manufacturing, industrial monitoring and military reconnaissance. However, in a condition of high resolution and/or a high frame rate, a huge amount of data is generated, resulting in high power consumption of a chip, which means that a higher requirement is imposed on the chip in aspects such as a transmission bandwidth and data calculation capability. However, since the EVS only detects an event in which the intensity of incident light changes, and outputs an EVS image (i.e., an event image) based on the detected event, the amount of data of the EVS is relatively low, resulting in a relatively low resolution of the EVS. In view of this, the technology of mutual integration of APS and EVS becomes a hot spot in the industry.

In the related art, there is a solution that the APS and the EVS are integrated with each other: the photoelectric current generated by a photodiode in the EVS is replicated to form APS, so as to achieve the mutual integration of EVS and APS. However, this solution is easy to introduce a large amount of noise during the replication of the photoelectric current, which seriously affects the imaging quality of the APS. In addition, during the output image, it is impossible to output an APS image and an EVS image via a single pixel at the same time. Moreover, both APS and EVS need a photoelectric conversion device configured to detect light, and the photoelectric conversion device will occupy most of the space of the image sensor, which greatly increases the size of the image sensor. It can be seen that there are many disadvantages of image sensors using the above-mentioned integration solution, such as large power consumption, large noise and large size. Therefore, the embodiments of the present application provide an image sensor, which may be applied to a photoelectric device. The photoelectric device is a device that needs to convert incident light into a corresponding electrical signal, such as digital camera, video camera, video recorder, fax machine, image scanner and digital television.

Referring to FIG. 1, FIG. 1 is a block diagram of a first module of a pixel according to an embodiment of the present application. An image sensor provided by an embodiment of the present application includes a pixel array consisting of a plurality of pixels. The pixel array is configured as two types of pixels including an APS pixel and an EVS pixel. The image sensor includes four circuits, which are respectively an input circuit 100, an APS circuit 200, an EVS circuit 300, and a control circuit 400. The input circuit 100 is connected to the APS circuit 200 and the EVS circuit 300. The control circuit 400 is connected to the APS circuit 200 and the EVS circuit 300. Here, it is necessary to explain that the APS pixel includes the input circuit 100, the APS circuit 200 and the control circuit 400, and the EVS pixel includes the input circuit 100, the EVS circuit 300 and the control circuit 400. It can be seen therefrom that the APS pixel and the EVS pixel share the same input circuit 100 and the same control circuit 400, that is, it is not necessary to provide one input circuit 100 and one control circuit 400 for the APS pixel and the EVS pixel, respectively. It can be understood that the APS pixel is configured to output an APS image, and the EVS pixel is configured to output an EVS image. When a single pixel includes both the APS pixel and the EVS pixel, the single pixel can output both the APS image and the EVS image. When a single pixel only includes the APS pixel, the single pixel can only output an APS image. When a single pixel only includes an EVS pixel, the single pixel can only output an EVS image. Hereinafter, the embodiments of the present application will give more details on the image sensor provided by the embodiments of the present application in the case that a single pixel includes both the APS pixel and the EVS pixel.

Figure 2:
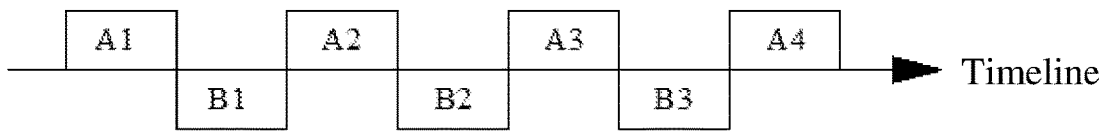
FIG. 2 is a diagram illustrating a working period unit of an input circuit according to an embodiment of the present application.

In the embodiment of the present application, the working period unit of the input circuit 100 includes an EVS mode working period and an APS mode working period, and a single APS mode working period is provided between adjacent EVS mode working periods. Herein, the working period unit may be a working time for normally outputting one frame of APS image. As an example, referring to FIG. 2, FIG. 2 is a diagram illustrating a working period unit of an input circuit according to an embodiment of the present application. A1, A2, A3 and A4 are all EVS mode working periods, and B1, B2 and B3 are all APS mode working periods.

Specifically, the input circuit 100 includes a photoelectric conversion element, which is configured to perform a photoelectric conversion on incident light. That is, the input circuit 100 performs a first photoelectric conversion on the incident light to generate a corresponding photoelectric current during the EVS mode working period, and performs a second photoelectric conversion on the incident light to generate corresponding photoelectric charges during the APS mode working period. The first photoelectric conversion is the EVS exposure, and the second photoelectric conversion is the APS exposure. It can be seen therefrom that a part of period (i.e., APS mode working period) of an EVS exposure process is divided up to perform the APS exposure. That is, the EVS exposure and the APS exposure are performed alternately. For example, taking A1, B1, and A2 in FIG. 2 as an example, a portion (i.e., B1) of the EVS exposure process (i.e., a subsequent period between A1 and A2) is divided up to perform the APS exposure. In addition, with regard to an arrangement form of the input circuit 100, one input circuit 100 may be arranged in each pixel in the pixel array. Alternatively, only one input circuit 100 is provided, so that all pixels in the pixel array share the same input circuit 100. Alternatively, a plurality of input circuits 100 are provided, so that all pixels within the same array unit in the pixel array share the same input circuit 100. The pixel array may be divided into a plurality of array units, and each array unit includes a preset number of pixels. As an example, each column of pixels in the pixel array constitutes an array unit, or each row of pixels in the pixel array constitutes an array unit.

Specifically, the EVS circuit 300 is configured to output a corresponding event signal according to a difference between a first voltage corresponding to a photoelectric current and a reference voltage during a process of the first photoelectric conversion. The event signal is configured to generate corresponding EVS images. In a practical application, if a pixel is outputting an EVS image, the input circuit 100 performs the first photoelectric conversion on the incident light, and outputs a corresponding photoelectric current to the EVS circuit 300. Thereafter, the EVS circuit 300 outputs a corresponding event signal based on the difference between a corresponding first voltage of the received photoelectric current and a reference voltage, so as to subsequently generate a corresponding EVS image with the output event signal. Here, it is necessary to explain that the difference between the first voltage and the reference voltage is configured to indicate a change (i.e., increase, decrease, or do not change) in the intensity of the incident light, which means that the EVS circuit 300 actually outputs corresponding event signals in accordance with changes in the intensity of the incident light. For example, the change in the intensity of the incident light is determined by whether the difference between the first voltage and the reference voltage is greater than 0, less than 0, or equal to 0.

Specifically, the APS circuit 200 is configured to output a corresponding grayscale signal according to a second voltage corresponding to the photoelectric charges during a subsequent process of the first photoelectric conversion (i.e., during the process of a next first photoelectric conversion after completing the second photoelectric conversion, or in the next EVS mode working period adjacent to the APS mode working period). The grayscale signal is configured to generate a corresponding APS image. For example, taking A1, B1 and A2 in FIG. 2 as an example, the input circuit 100 may perform the second photoelectric conversion on the incident light in B1 to generate the corresponding photoelectric charges, and the APS circuit 200 may output the corresponding grayscale signal in A2 according to the second voltage corresponding to the generated photoelectric charges. It can be understood that the process of outputting the grayscale signal by the APS circuit 200 is actually a readout process of the APS, and the process of outputting the grayscale signal by the APS circuit 200 is performed within the next EVS mode working period (e.g., A2) adjacent to the APS mode working period (e.g., B1). Besides, the EVS operation may still continue to be performed in A2. That is, the readout process of the APS does not affect the exposure and readout of the EVS, so that a single pixel can output an APS image and an EVS image simultaneously when the single pixel includes both the APS pixel and the EVS pixel.

Specifically, the control circuit 400 is configured to output a corresponding APS image according to the grayscale signal and output a corresponding EVS image according to the event signal. In a practical application, if the pixel is outputting an APS image, the APS circuit 200 outputs a corresponding grayscale signal to the control circuit 400 according to the received second voltage corresponding to the photoelectric charges. Thereafter, the control circuit 400 outputs the corresponding APS image according to the received grayscale signal for displaying to the user. Likewise, if the pixel is performing the output of the EVS image, the EVS circuit 300 outputs a corresponding event signal to the control circuit 400 according to the difference between the first voltage corresponding to the received photoelectric current and the reference voltage. Thereafter, the control circuit 400 outputs the corresponding EVS image according to the received event signal for displaying to the user. In addition, it should be noted that, with regard to the arrangement form of the control circuit 400, one control circuit 400 may be arranged in each pixel in the pixel array. Alternatively, only one control circuit 400 is provided, so that all the pixels in the pixel array share the same control circuit 400. Alternatively, a plurality of control circuits 400 are provided, so that all pixels within the same array unit in the pixel array share the same control circuit 400.

As described above, when a single pixel includes both the APS pixel and the EVS pixel, the single pixel includes at least the APS circuit 200 and the EVS circuit 300. Regarding the input circuit 100 and the control circuit 400, the single pixel may be shared with other pixels, or may be provided separately.

In addition, as mentioned above, the process that the input circuit 100 performs the second photoelectric conversion on the incident light to generate the corresponding photoelectric charges is actually the exposure process when the APS image is output. Generally, the APS exposure mode includes global exposure and rolling shutter exposure. The global exposure indicates that all pixels in a pixel array are simultaneously exposed at a certain moment, and are simultaneously finished at another moment, and after the exposure is finished, all generated photoelectric charges are transmitted from a photosensitive region (i.e., input circuit 100) to a charge detection amplifier (i.e., floating diffusion node (FD1) in the following), and then all pixel data (i.e., grayscale signal) in the pixel array are read out row by row via an APS readout circuit 220. In this process, the elapsed period from the beginning of reading the pixel data of the pixels in the first row in the pixel array to the end of reading the pixel data of the pixels in the last row in the pixel array is the readout period. In the rolling shutter exposure, although the exposure period of each row of pixels in a pixel array is the same, the exposure starting time and the exposure end time of pixels in different rows in the pixel array are different. That is, the exposure time of pixels in different rows in the pixel array does not completely coincide, in other words, the exposure starting time of each row of pixels in the pixel array is later than the exposure starting time of pixels in the previous row. Furthermore, each row of pixels in the pixel array can transmit the photoelectric charges generated by the row of pixels from a photoreception region to a charge detection amplifier only after finishing the exposure. Furthermore, the pixel data in the next row can be read only after the pixel data of this row are read by the APS readout circuit 220, Therefore, the elapsed period from the time when the APS readout circuit 220 outputs the pixel data of the pixels in the first row in the pixel array to the time when the APS readout circuit 220 outputs the pixel data of the pixels in the last row in the pixel array is the readout period.

The image sensor provided by an embodiment of the present application includes a pixel array consisting of a plurality of pixels, and the pixel array is configured as two types of pixels including an APS pixel and an EVS pixel. Specifically, the image sensor includes four circuits, which are respectively an input circuit 100, an APS circuit 200, an EVS circuit 300 and a control circuit 400. A working period unit of the input circuit 100 includes an EVS mode working period and an APS mode working period, and a single APS mode working period is provided between two adjacent EVS mode working periods. In the embodiment of the present application, the input circuit 100 is configured to perform a first photoelectric conversion (i.e., EVS exposure) on incident light, and generate a corresponding photoelectric current for use by the EVS circuit 300 to obtain a corresponding event signal during the EVS mode working period. The input circuit 100 is further configured to perform a second photoelectric conversion (i.e., APS exposure) on the incident light during the APS mode working period, and generate corresponding photoelectric charges for use by the APS circuit 200 to obtain a corresponding grayscale signal. The control circuit 400 is configured to output a corresponding APS image according to the grayscale signal, and output a corresponding EVS image according to the event signal. It can be seen therefrom that the APS pixel and the EVS pixel share the same input circuit 100 and the same control circuit 400, that is, it is not necessary to separately provide an input circuit 100 and a control circuit 400 for the APS pixel and the EVS pixel, so that the size of the image sensor can be significantly reduced. Importantly, a single APS mode working period is provided between two adjacent EVS mode working periods, which means that a portion (i.e., APS mode working period) of the EVS exposure process is divided up to perform the APS exposure. Besides, during the process of the first photoelectric conversion (i.e., during the next first photoelectric conversion after completing the second photoelectric conversion, or in other words, during the next EVS mode working period adjacent to the APS mode working period), the APS circuit 200 outputs a corresponding grayscale signal according to the second voltage corresponding to the photoelectric charges. Therefore, the readout of the APS does not affect exposure and readout of the EVS, so that multiple frames of EVS images can be output while outputting one frame of APS image. Hence, when a single pixel includes both an APS pixel and an EVS pixel, the single pixel can output an APS image and an EVS image simultaneously, thereby truly realizing a mutual integration between the APS and the EVS.

Figure 3:
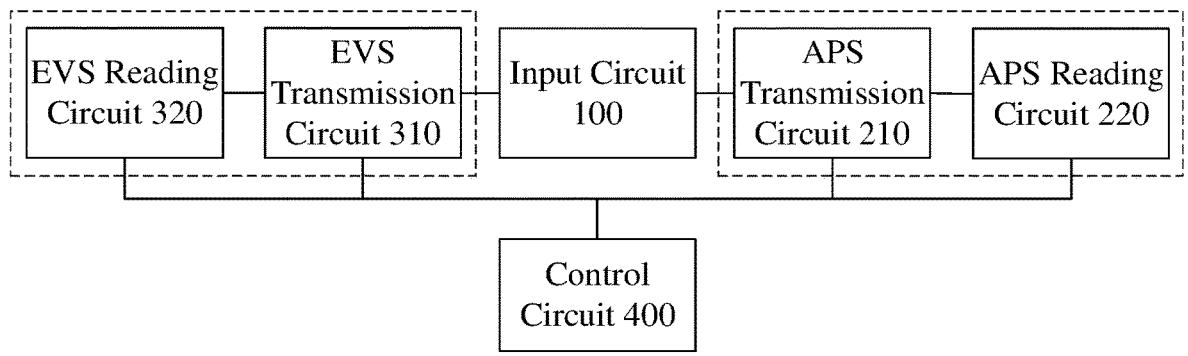
FIG. 3 is a block diagram of a second module of the pixel according to an embodiment of the present application.

In some embodiments, referring to FIG. 3, FIG. 3 is a block diagram of a second module of the pixel according to an embodiment of the present application. The EVS circuit 300 may include an EVS transmission circuit 310 and an EVS readout circuit 320. The EVS transmission circuit 310 is connected to the input circuit 100 and the EVS readout circuit 320, and the control circuit 400 is connected to the EVS transmission circuit 310 and the EVS readout circuit 320. Specifically, the EVS transmission circuit 310 is configured to output a corresponding first voltage according to a photoelectric current during the process of the first photoelectric conversion. The EVS readout circuit 320 is configured to output a corresponding event signal according to the difference between the first voltage and the reference voltage. It can be understood that, in this embodiment, the EVS circuit 300 firstly outputs a corresponding first voltage according to the received photoelectric current via the EVS transmission circuit 310, and then outputs a corresponding event signal according to the difference between the received first voltage and the reference voltage via the EVS readout circuit 320, so as to subsequently generate a corresponding EVS image using the output event signal. In addition, it should be noted that, with regard to an arrangement form of the EVS readout circuit 320, one EVS readout circuit 320 may be provided in each pixel in the pixel array. Alternatively, only one EVS readout circuit 320 is provided, so that all pixels in the pixel array share the same EVS readout circuit 320. Alternatively, a plurality of EVS readout circuits 320 are provided, so that all pixels within the same array unit in the pixel array share the same EVS readout circuit 320.

The APS circuit 200 may include an APS transmission circuit 210 and an APS readout circuit 220. The APS transmission circuit 210 is connected to the input circuit 100 and the APS readout circuit 220, and the control circuit 400 is connected to the APS transmission circuit 210 and the APS readout circuit 220. Specifically, the APS transmission circuit 210 is configured to output a corresponding second voltage according to the photoelectric charges during the subsequent process of the first photoelectric conversion. The APS readout circuit 220 is configured to output a corresponding grayscale signal according to the second voltage. It can be understood that, in this embodiment, the APS circuit 200 firstly outputs a corresponding second voltage according to the received photoelectric charges by the APS transmission circuit 210, and then outputs a corresponding grayscale signal according to the received second voltage by the APS readout circuit 220, so as to generate a corresponding APS image subsequently using the output grayscale signal. In addition, it should be noted that, with regard to an arrangement form of the APS readout circuit 220, one APS readout circuit 220 may be arranged in each pixel in the pixel array. Alternatively, only one APS readout circuit 220 is provided, so that all pixels in the pixel array share the same APS readout circuit 220. Alternatively, a plurality of APS readout circuits 220 are provided, so that all pixels in the same array unit in the pixel array share the same APS readout circuit 220.

It can be seen from the above that, in this embodiment, when a single pixel includes both an APS pixel and an EVS pixel, the single pixel includes at least an APS transmission circuit 210 and an EVS transmission circuit 310. However, for the APS readout circuit 220 and the EVS readout circuit 320, the single pixel may be shared with other pixels, and may also be provided separately.

Figure 4:
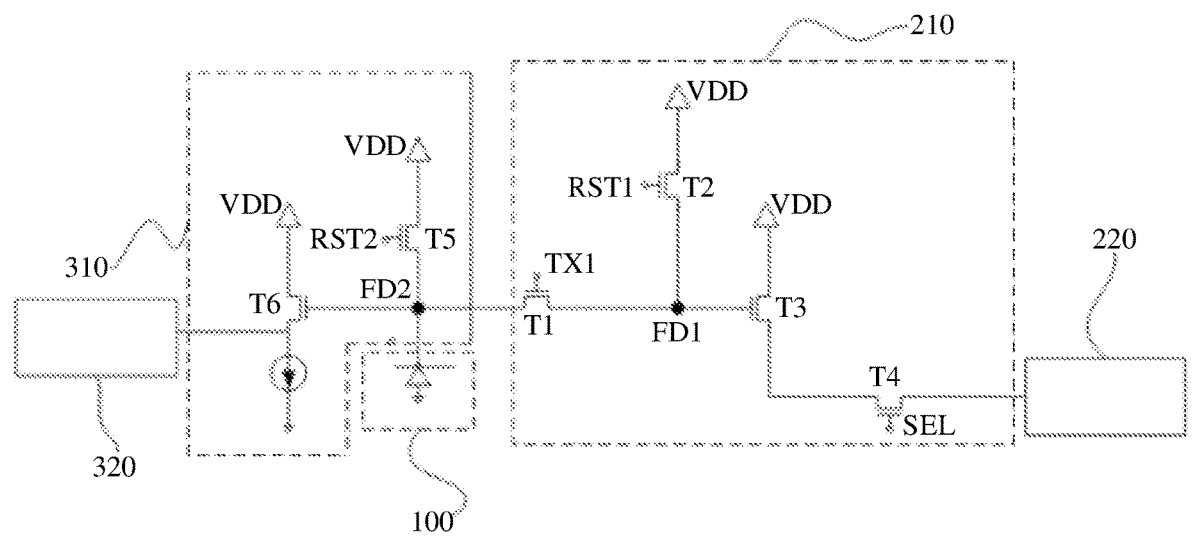
FIG. 4 is a structure diagram of a first circuit of the pixel according to an embodiment of the present application.

As an embodiment, referring to FIG. 4, FIG. 4 is a structure diagram of a first circuit of the pixel according to an embodiment of the present application. The APS transmission circuit 210 may include a first transmission branch circuit, a floating diffusion node FD1 and an output branch circuit. The first transmission branch circuit is connected to the input circuit 100, the control circuit 400 and the floating diffusion node FD1. The output branch circuit is connected to the floating diffusion node FD1, the control circuit 400 and the APS readout circuit 220. In this embodiment, the first transmission branch circuit is configured to trigger a working state via a control signal TX1 sent by the control circuit 400 during the subsequent process of the first photoelectric conversion. When the first transmission branch circuit is in the working state, the first transmission branch circuit is configured to transmit the photoelectric charges generated by the input circuit 100 to the floating diffusion node FD1. The floating diffusion node FD1 is configured to accumulate the photoelectric charges and generate a corresponding second voltage. The output branch circuit is configured to trigger a working state via a control signal SEL sent by the control circuit 400. When the output branch circuit is in the working state, the output branch circuit is configured to transmit the second voltage at the floating diffusion node FD1 to the APS readout circuit 220, so that the APS readout circuit 220 subsequently outputs a corresponding grayscale signal according to the received second voltage.

Specifically, the output branch circuit may include a first driving branch circuit and a selecting branch circuit. The selecting branch circuit is connected to the first driving branch circuit, the control circuit 400 and the APS readout circuit 220. The first driving branch circuit is further connected to the floating diffusion node FD1. In this embodiment, the first driving branch circuit is configured to buffer the potential of the floating diffusion node FD1 and output the second voltage to the selecting branch circuit. The selecting branch circuit is configured to trigger a working state via a control signal SEL sent by the control circuit 400. When the selecting branch circuit is in the working state, the selecting branch circuit is configured to transmit the second voltage at the floating diffusion node FD1 to the APS readout circuit 220, so that the APS readout circuit 220 subsequently outputs a corresponding grayscale signal according to the received second voltage.

Further, the APS transmission circuit 210 may further include a first reset branch circuit connected to the floating diffusion node FD1 and the control circuit 400. In this embodiment, the first reset branch circuit is configured to trigger a working state via a control signal RST1 sent by the control circuit 400 after the selecting branch circuit completes the transmission of the second voltage to the APS readout circuit 220. When the first reset branch circuit is in the working state, the photoelectric charges accumulated at the floating diffusion node FD1 move to the outside.

Specifically, the first reset branch circuit may include a first reset transistor T2. A source electrode of the first rest transistor T2 is connected to the floating diffusion node FD1. A gate electrode is connected to the control circuit 400, and a drain electrode is connected to the power supply VDD. In this embodiment, the first reset transistor T2 is configured to trigger an ON state via the control signal RST1 sent by the control circuit 400 after the selecting branch circuit completes the transmission of the second voltage to the APS readout circuit 220. When the first reset transistor T2 is in the ON state, the photoelectric charges accumulated at the floating diffusion node FD1 move to the power supply VDD.

For this embodiment, still referring to FIG. 4, the EVS transmission circuit 310 may include a second reset branch circuit and a second driving branch circuit. The second reset branch circuit and the second driving branch circuit are both connected to the input circuit 100. The second reset branch circuit is further connected to the control circuit 400, and the second driving branch circuit is further connected to the EVS readout circuit 320. In this embodiment, the second reset branch circuit is configured to trigger a working state via a control signal RST2 sent by the control circuit 400 during the process of the first photoelectric conversion. When the second reset branch circuit is in the working state, the second reset branch circuit is configured to output a corresponding first voltage according to a photoelectric current generated by the input circuit 100. The second driving branch circuit is configured to transmit the first voltage generated by the second reset branch circuit to the EVS readout circuit 320, so that the EVS readout circuit 320 subsequently outputs a corresponding event signal according to a difference between the received first voltage and a reference voltage.

Specifically, the second reset branch circuit may include a second reset transistor T5. A drain electrode and a gate electrode of the second reset transistor T5 are both configured to be connected to the power supply VDD, and a source electrode of the second reset transistor T5 and the second driving branch circuit are both connected to the input circuit 100. The gate electrode of the second reset transistor T5 is further connected to the control circuit 400. In this embodiment, the second reset transistor T5 is configured to trigger an ON state via the control signal RST2 sent by the control circuit 400 during the process of the first photoelectric conversion. When the second reset transistor T5 is in the ON state, the second reset transistor T5 is configured to output a corresponding first voltage according to the photoelectric current generated by the input circuit 100. The photoelectric current is equal to the current between the drain electrode and the source electrode of the second reset transistor T5. The first voltage is equal to the voltage between the drain electrode and the source electrode of the second reset transistor T5, and there is a logarithm relationship between the photoelectric current and the first voltage.

As a specific implementation of this embodiment, still referring to FIG. 4, in the APS transmission circuit 210, except that the first reset branch circuit is formed by the first reset transistor T2, other branch circuits may also be formed by corresponding transistors. For example, the first transmission branch circuit includes the first transmission transistor T1, the first driving branch circuit includes the first driving transistor T3, and the selecting branch circuit includes the selecting transistor T4. Accordingly, in the EVS transmission circuit 310, except that the second reset branch circuit is formed by the second reset transistor T5, other branch circuits may also be formed by corresponding transistors, for example, the second driving branch circuit includes the second driving transistor T6.

In this particular implementation, the APS transmission circuit 210 may include the first transmission transistor T1, the first reset transistor T2, the first driving transistor T3, the selecting transistor T4 and the floating diffusion node FD1. A first end of the first transmission transistor T1 is connected to the input circuit 100. A second end of the first transmission transistor T1, the source electrode of the first reset transistor T2 and the gate electrode of the first driving transistor T3 are all connected to the floating diffusion node FD1. The drain electrode of the first reset transistor T2 and the drain electrode of the first driving transistor T3 are both configured to be connected to a power supply VDD. The source electrode of the first driving transistor T3 is connected to the drain of the selecting transistor T4, and the source of the selecting transistor T4 is connected to the APS readout circuit 220. A third terminal of the first transmission transistor T1, the gate electrode of the first reset transistor T2 and the gate electrode of the selecting transistor T4 are all connected to the control circuit 400.

Specifically, the first reset transistor T2 is configured to trigger an OFF state according to the control signal RST1 sent by the control circuit 400 during the subsequent process of the first photoelectric conversion and before the first transmission transistor T1 is in the ON state. As an example, the first reset transistor T2 may trigger its own ON state or OFF state according to a level state of the control signal RST1. For example, when the control signal RST1 is at a high level, the first reset transistor T2 triggers the ON state. When the control signal RST1 is at a low level, the first reset transistor T2 triggers the OFF state, and other transistors mentioned below are also applicable.

Specifically, the first transmission transistor T1 is configured to trigger the ON state according to a control signal TX1 sent by the control circuit 400 during the subsequent process of the first photoelectric conversion and after the first reset transistor T2 is in the OFF state. When the first transmission transistor T1 is in the ON state, the first transmission transistor T1 is configured to transmit the photoelectric charges generated by the input circuit 100 to the floating diffusion node FD1. In addition, the first transmission transistor T1 is further configured to trigger the OFF state according to the control signal TX1 sent by the control circuit 400 during the subsequent process of the first photoelectric conversion and after the transmission of the photoelectric charges generated by the input circuit 100 to the floating diffusion node FD1 is completed. When the first transmission transistor T1 is in the OFF state, the first transmission transistor T1 cannot transmit the photoelectric charges generated by the input circuit 100 to the floating diffusion node FD1.

Specifically, the floating diffusion node FD1 is configured to accumulate the photoelectric charges transmitted through the first transmission transistor T1 during the subsequent process of the first photoelectric conversion, so as to form the corresponding second voltage. Here, it is necessary to explain that the floating diffusion node FD1 is equivalent to a charge detection amplifier in this particular implementation.

Specifically, the first driving transistor T3 is configured to transmit the second voltage formed by the floating diffusion node FD1 to the selecting transistor T4 during the subsequent process of the first photoelectric conversion. Here, it is necessary to explain that, in the specific implementation, the first driving transistor T3 is equivalent to a source follower amplifier, which can buffer the potential at the floating diffusion node FD1, so that a voltage consistent with the second voltage can be output to the selecting transistor T4.

Specifically, the selecting transistor T4 is configured to trigger an ON state according to the control signal SEL sent by the control circuit 400 during the subsequent process of the first photoelectric conversion. When the selecting transistor T4 is in the ON state, the selecting transistor T4 can transmit the received second voltage to the APS readout circuit 220, so that the APS readout circuit 220 subsequently outputs a corresponding grayscale signal according to the received second voltage. In addition, the selecting transistor T4 is further configured to trigger an OFF state according to the control signal SEL sent by the control circuit 400 during the sub sequent process of the first photoelectric conversion and after the received second voltage has been transmitted to the APS readout circuit 220. When the selecting transistor T4 is in the OFF state, the selecting transistor T4 cannot transmit the received second voltage to the APS readout circuit 220.

Specifically, the first reset transistor T2 is further configured to trigger the ON state according to the control signal RST1 sent by the control circuit 400 after the selecting transistor T4 completes the transmission of the received second voltage to the APS readout circuit 220. When the first reset transistor T2 is in the ON state, the floating diffusion node FD1 is short-circuited with the power supply VDD, that is, the photoelectric charges accumulated at the floating diffusion node FD1 move to the power supply VDD, thereby resetting the floating diffusion node FD1. Accordingly, when the first reset transistor T2 is in the OFF state, the photoelectric charges accumulated at the floating diffusion node FD1 can not move to the power supply VDD, that is, the floating diffusion node FD1 will not be reset. It can be understood that, while readout the APS, it is required to accumulate the photoelectric charges at the floating diffusion node FD1, that is, the floating diffusion node FD1 cannot be reset. Therefore, during the subsequent process of the first photoelectric conversion and before the first transmission transistor T1 is in the ON state, the first reset transistor T2 needs to trigger the OFF state according to the control signal RST1 sent by the control circuit 400.

For the specific implementation, still referring to FIG. 4, the EVS transmission circuit 310 may include a second reset transistor T5 and a second driving transistor T6. A source electrode of the second reset transistor T5 and a gate electrode of the second driving transistor T6 are both connected to the input circuit 100. A drain electrode of the second driving transistor T6, a drain electrode of the second reset transistor T5 and a gate electrode of the second reset transistor T5 are both connected to the power supply VDD. A source electrode of the second driving transistor T6 is connected to the EVS readout circuit 320, and a gate electrode of the second reset transistor T5 is further connected to the control circuit 400. It can be understood that, when the drain electrode and the gate electrode of the second reset transistor T5 are both connected to the power supply VDD, a drain-source voltage and a drain-source current may be formed between the drain electrode and the source electrode of the second reset transistor T5, and there is a logarithm relationship between the formed drain-source voltage and drain-source current.

Specifically, the second reset transistor T5 is configured to trigger the ON state according to the control signal RST2 sent by the control circuit 400, so as to output a corresponding first voltage to the second driving transistor T6 according to the photoelectric current transmitted by the input circuit 100 during the process of the first photoelectric conversion (e.g., A1 in FIG. 2), and during the subsequent process of the first photoelectric conversion (e.g., A2, A3 and A4 in FIG. 2), and after the selecting transistor T4 completes the transmission of the received second voltage to the APS readout circuit 220, or during the process in which the selecting transistor T4 transmits the received second voltage to the APS readout circuit 220. The photoelectric current is equal to the current (i.e., a drain-source current) between the drain electrode and the source electrode of the second reset transistor T5, the first voltage is equal to the voltage (i.e., a drain-source voltage) between the drain electrode and the source electrode of the second reset transistor T5, and there is a logarithm relationship between the photoelectric current and the first voltage.

Specifically, the second driving transistor T6 is configured to transmit the received first voltage to the EVS readout circuit 320, so that the EVS readout circuit 320 subsequently outputs a corresponding event signal according to a difference between the received first voltage and a reference voltage. It is necessary to explain that the second driving transistor T6 is equivalent to a voltage buffer in this specific implementation, which can output a voltage in accordance with the first voltage to the EVS readout circuit 320.

Specifically, the second reset transistor T5 is further configured to trigger the OFF state according to the control signal RST2 sent by the control circuit 400 while performing the APS exposure. When the second reset transistor T5 is in the OFF state, it cannot output the first voltage to the second driving transistor T6.

It can be seen from the above-mentioned description of the specific implementation, in the specific implementation, there are six transistors in total adopted in the APS transmission circuit 210 and the EVS transmission circuit 310. In this case, the photoelectric conversion elements in the input circuit 100 may adopt, but are not limited to, photodiodes and phototransistors.

Figure 5:
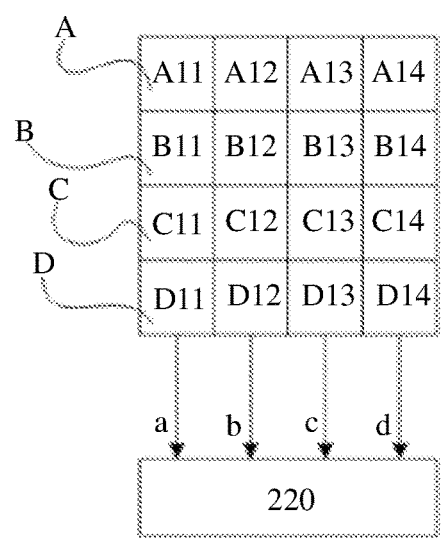
FIG. 5 is a structural diagram of a pixel array according to an embodiment of the present application.

In order to clearly understand the specific implementation, the specific implementation will be described in detail below with a specific example. Referring to FIG. 5 further, FIG. 5 is a structural diagram of a pixel array according to an embodiment of the present application. In this embodiment, the pixel array is a 4×4 matrix (i.e., includes 16 pixels in total), and A, B, C, and D respectively denote a first row, a second row, a third row, and a fourth row in the pixel array, and four APS readout circuits 220 (i.e., a, b, c and d) are provided to complete parallel readout in the column direction in the pixel array (i.e., pixels in the same column in the pixel array share the same APS readout circuit). For example, when A11, A12, A13 and A14 of the A rows of pixels are selected, the pixel data thereof are read out via four APS readout circuits 220 (i.e., a, b, c and d). Likewise, after the pixel data of the pixels of the A rows are read out, the pixels of the B, C and D rows can be read out row by row by the four APS readout circuits 220 (i.e., a, b, c and d). It should be noted that when the pixels in the A rows are selected, the readout channels for the pixels in the B, C and D rows are turned off. It can be understood that, described above is only an example, and the size of the pixel matrix may be set according to a practical application scenario, for example, a 480×640 matrix, which is not limited in the embodiment of the present application.

Figure 6:
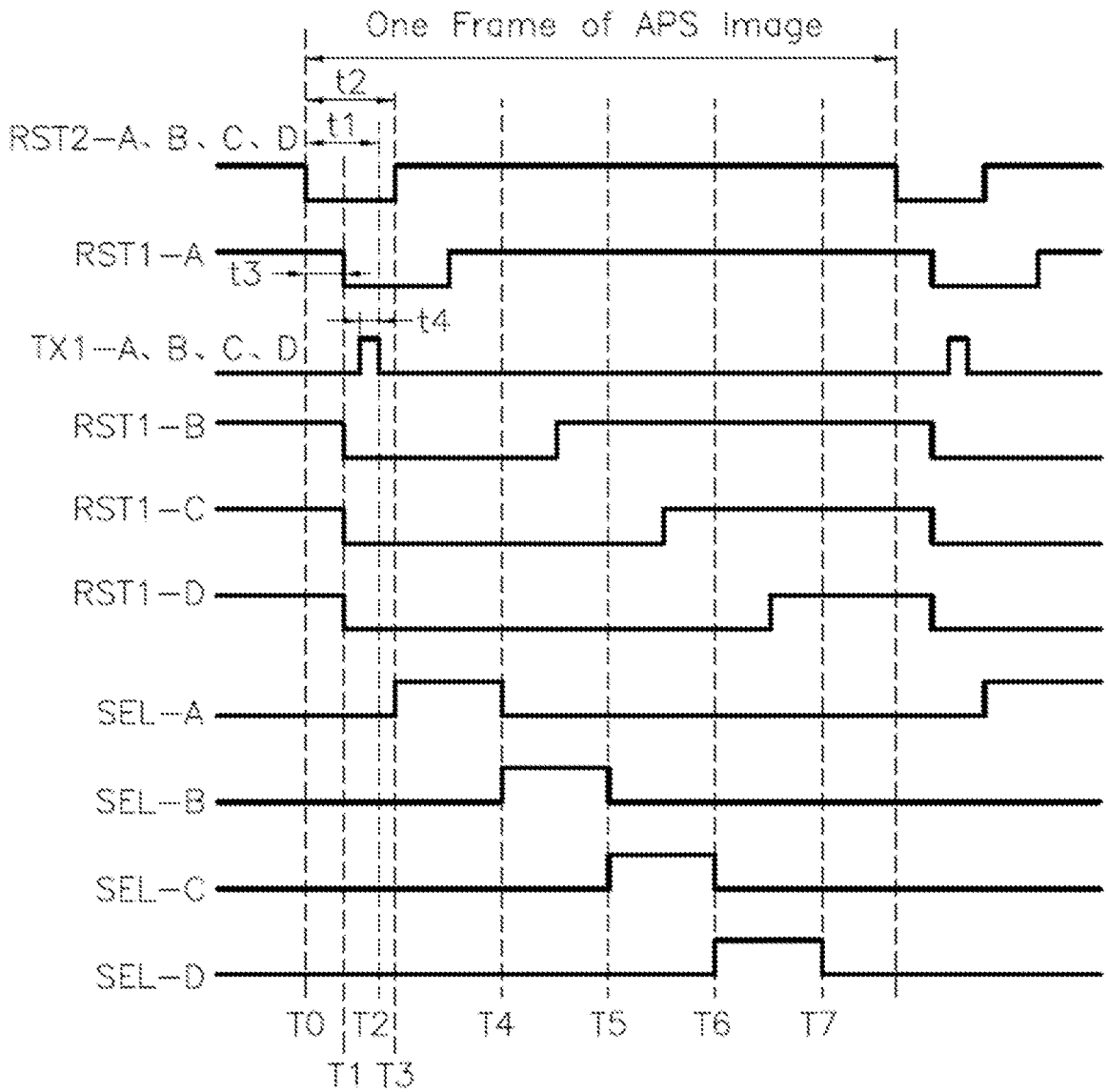
FIG. 6 is a diagram illustrating a first ON/OFF state of each transistor in the pixel when the pixel structure is as shown in FIG. 4 according to an embodiment of the present application.

When the APS exposure mode is a global exposure mode, referring to FIG. 6, FIG. 6 is a diagram illustrating a first ON/OFF state of each transistor in the pixel when the pixel structure is as shown in FIG. 4 according to an embodiment of the present application. The term before "-" indicates a control signal (for example, when RST2 is before "-", it indicates a control signal RST2), and the term after "-" indicates the number of rows of pixels (for example, when A is after "-", it indicates A rows of pixels. When A, B, C, and D are after "-", it indicates the pixel in row A, the pixel in row B, the pixel in row C, and the pixel in row D, and the same also applies to the other on/off state diagrams. Before TO moment, the pixel is outputting the EVS image, the control circuit 400 controls the RST2 of the pixel in the row A-D to be at a high level, the gate electrode and the drain electrode of the second reset transistor T5 of the pixel in the row A-D are short-circuited, and the first transmission transistor T1 of the pixel in the row A-D is in an OFF state. The input circuit 100 at this time is configured to perform the first photoelectric conversion on the incident light to generate a corresponding photoelectric current. The generated photoelectric current is transmitted to the second reset transistor T5, so that the second reset transistor T5 generates a corresponding first voltage according to the photoelectric current. The second driving transistor T6 transmits the first voltage to the EVS readout circuit 320, so that the EVS readout circuit 320 determines a change in the intensity of the light intensity according to a difference value between the first voltage and the reference voltage, and outputs a corresponding event signal. At T0 moment, the pixel starts outputting the APS image, the control circuit 400 controls the RST2 in each pixel in row A-D to be at a low level, and the second reset transistor T5 in each pixel in row A-D is turned off. The input circuit 100 at this time is configured to perform a second photoelectric conversion on the incident light to generate corresponding photoelectric charges. At T1 moment, the control circuit 400 controls the RST1 in each pixel in row A-D to be at a low level, so that the first reset transistor T2 in each pixel in row A-D is in an off state, which is configured to release the reset of the floating diffusion node FD1. The control circuit 400 controls the TX1 in each pixel in row A-D to be at a high level at the t4 moment, so that the first transmission transistor T1 in each pixel in row A-D is in an ON state. At this time, the first transmission transistor T1 in each pixel in row A-D transmits the photoelectric charges to respective floating diffusion nodes FD1, so as to form the corresponding second voltages. The first driving transistor T3 transmits the second voltage to the selecting transistor T4. At T3 moment, the control circuit 400 controls the SEL in each pixel in row A to be at a high level, so that the selecting transistor T4 in each pixel in row A is in an ON state, that is, A11, A12, A13, and A14 in each pixel in row A are selected, and pixel data of A11, A12, A13, and A14 in each pixel in row A is read out through four APS readout circuits 220 (i.e., a, b, c, and d). At T4 moment, the control circuit 400 controls the SEL in the pixels in row B to be at a high level, so that the selecting transistors T4 in the pixels in row B are in an ON state, that is, blocks B11, B12, B13, and B14 in each pixel in row B are selected, and pixel data of B11, B12, B13, and B14 in each pixel in row B are read out via the four APS readout circuits 220 (i.e., a, b, c, and d). At T5 moment, the control circuit 400 controls the SEL in each pixel in row C to be at a high level, so that the selecting transistor T4 in each pixel in row C is in an ON state, that is, C11, C12, C13, and C14 in each pixel in row C are selected, and pixel data of C11, C12, C13, and C14 in each pixel in row C is read out through four APS readout circuits 220 (i.e., a, b, c, and d). At T6 moment, the control circuit 400 controls the SEL of the pixels in row D to be at a high level, so that the selecting transistors T4 in the pixels in row D are in an ON state, that is, the D11, D12, D13 and D14 in the pixels in row D are selected, and pixel data of the D11, D12, D13 and D14 in the pixels in row D is read out through the four APS readout circuits 220 (i.e., a, b, c and d). So far, a complete APS image is output.

Figure 7:
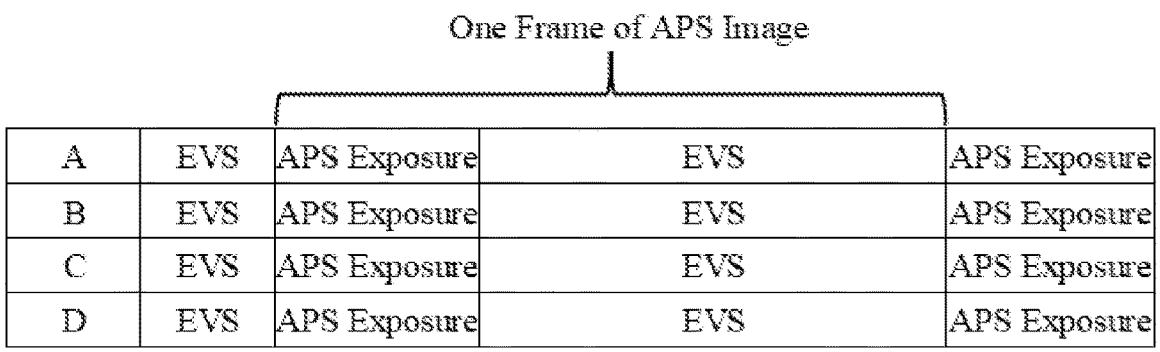
FIG. 7 is a diagram illustrating an image outputted by each transistor in the pixel in the ON/OFF state as shown in FIG. 6 according to an embodiment of the present application.

In the above-mentioned process, T3 moment to T7 moment are the readout period, and in the readout period, the control circuit 400 may control RST2 in each pixel in row A-D to be at a high level, the gate electrode and the drain electrode of the second reset transistor T5 in each pixel in row A-D are short-circuited, and the first transmission transistor T1 in each pixel in row A-D is in an OFF state. The input circuit 100 at this time is configured to perform the second photoelectric conversion on the incident light to generate a corresponding photoelectric current (i.e., "output of EVS images by pixels"). The generated photoelectric current is transmitted to the second reset transistor T5, so that the second reset transistor T5 generates a corresponding first voltage according to the photoelectric current. The second driving transistor T6 transmits the first voltage to the EVS readout circuit 320, so that the EVS readout circuit 320 determines a change in the intensity of the incident light according to a difference value between the first voltage and the reference voltage, and outputs a corresponding event signal. In addition, the image output in the above-mentioned process may be seen in FIG. 7, and FIG. 7 is a diagram illustrating an image outputted by each transistor in the pixel in the ON/OFF state as shown in FIG. 6 according to an embodiment of the present application.

It can be understood that, for the above-mentioned process, the purpose of arranging the SEL in each pixel in row A-D is to cooperate with the timing at which RST1 in each pixel in row A-D becomes a high level. That is, when each row of pixels are read out, the corresponding APS readout circuit 220 makes a difference between the electrical signal at the corresponding floating diffusion node FD1 and RST1, so as to cancel out an offset of the charge detection amplifier (i.e., the floating diffusion node FD1). Furthermore, it can be seen from the above-mentioned process that, in the embodiments of the present application, the APS exposure (i.e., the second photoelectric conversion on the incident light) is performed by using a small part of the time when the EVS images are output, and the EVS operation can be performed within the readout period of the APS, without affecting the output of the EVS images.

Figure 8:
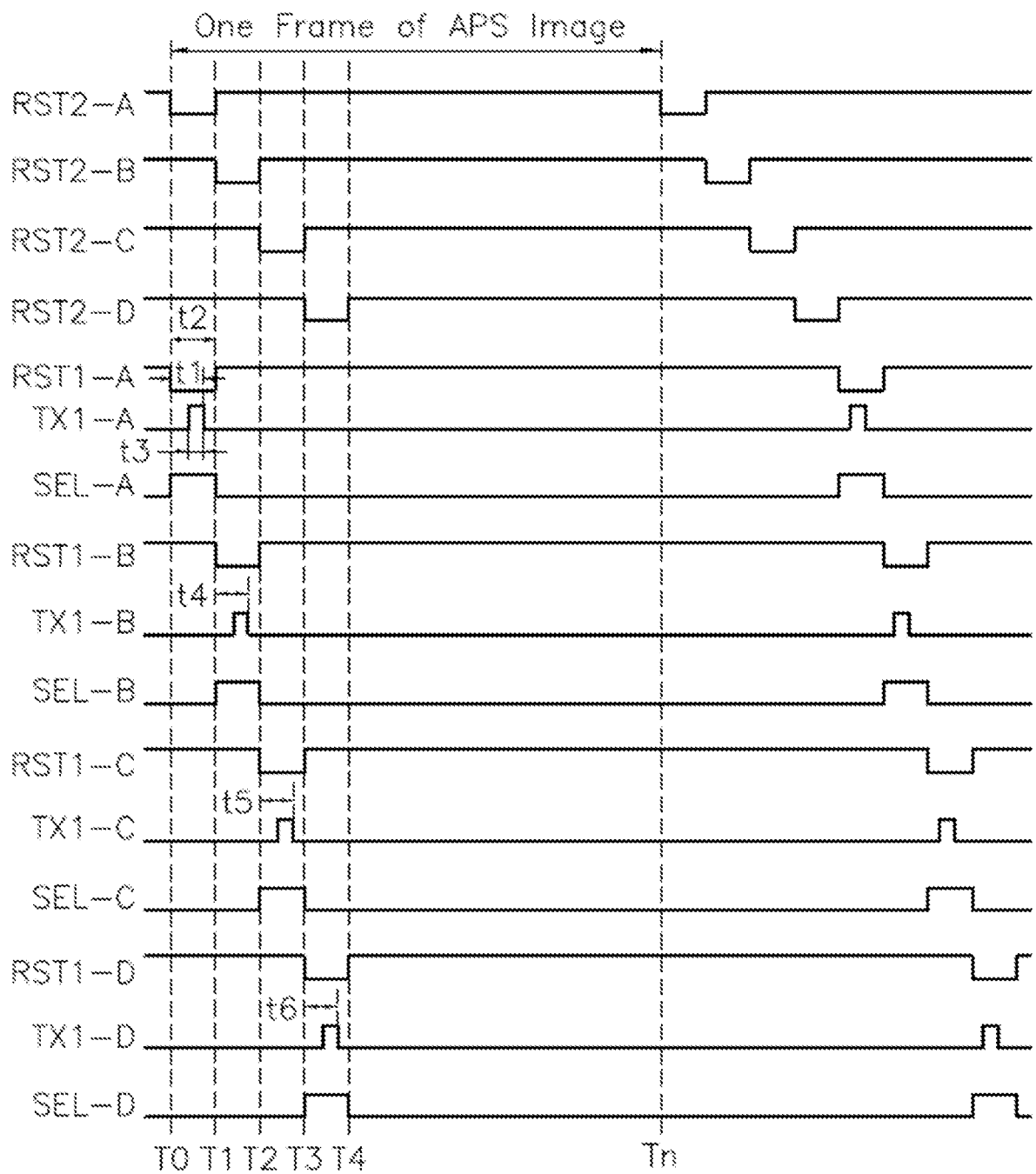
FIG. 8 is a diagram illustrating a second ON/OFF state of each transistor in the pixel when the pixel structure is as shown in FIG. 4 according to an embodiment of the present application.

When the exposure mode of the APS is a mode of rolling shutter exposure, referring to FIG. 8, FIG. 8 is a diagram illustrating a second ON/OFF state of each transistor in the pixel when the pixel structure is as shown in FIG. 4 according to an embodiment of the present application. At T0 moment, the control circuit 400 controls the RST2 and RST1 in the pixels in row A to be at a low level, so that the first reset transistor T2 and the second reset transistor T5 are in an OFF state. The input circuit 100 at this time is configured to perform the second photoelectric conversion on the incident light to generate corresponding photoelectric charges. The control circuit 400 controls the TX1 in each pixel in row A to be at a high level at a period t3, so that the first transmission transistor T1 in each pixel in row A is in an ON state, and the first transmission transistor T1 in the pixels in row A transmits the photoelectric charges to the floating diffusion node FD1, thereby forming a corresponding second voltage. The first driving transistor T3 transmits the second voltage to the selecting transistor T4. At T1 moment, the control circuit 400 controls the SEL in each pixel in row A to be at a high level, so that the selecting transistor T4 in each pixel in row A is in an ON state. That is, A11, A12, A13, and A14 in each pixel in row A are selected, and pixel data of A11, A12, A13, and A14 in each pixel in row A is read out by four APS readout circuits 220 (i.e., a, b, c, and d). At the same time, the control circuit 400 controls the RST2 and RST1 in each pixel in row A to be at a high level, and the TX1 to be at a low level, so that the first reset transistor T2 and the second reset transistor T5 in each pixel in row A are in an ON state, and the first transmission transistor T1 is turned off. That is, at T1 moment, the output of the EVS images for the pixel in row A starts. In addition, at T0 moment, the control circuit 400 may not control the RST1 in each pixel in row A to be at a low level, as long as it controls the RST1 to be at a low level before the first transmission transistor T1 is turned on.

Likewise, at a period of T1-T2, according to the above-mentioned process, B11, B12, B13 and B14 in each pixel in row B are selected, and pixel data of B11, B12, B13 and B14 in the B-row pixels is read out via four APS readout circuits 220 (i.e., a, b, c and d). At a period of T2-T3, according to the above-mentioned process, C11, C12, C13 and C14 in each pixel in row C are selected, and pixel data of C11, C12, C13 and C14 in each pixel in row C id read out via four APS readout circuits 220 (i.e., a, b, c and d). At a period of T3-T4, according to the above-mentioned process, D11, D12, D13 and D14 in each pixel in row D is selected, and pixel data of D11, D12, D13 and D14 in each pixel in row D is read out via four APS readout circuits 220 (i.e., a, b, c and d). Here, it is necessary to describe that, when the pixel in the row A outputs an APS image, the pixels in rows B, C, and D can output EVS images. The pixels in each row do not affect each other, and after the corresponding APS images pixels in each row are outputted, the RST2 and RST1 in the pixels in this row may be controlled to be at a high level, so that the second reset transistor T5 and the first reset transistor T2 in the row of pixels are in an ON state, thus starting the EVS image output for that row of pixels. In addition, the images outputted in the above-mentioned processes can be seen in FIG. 9, and FIG. 9 is a diagram illustrating the image outputted by each transistor in the pixel in the ON/OFF state as shown in FIG. 8 according to an embodiment of the present application.

In the above-mentioned process, the purpose of the so setting of the SEL in each pixel in row A-D is to cooperate with the timing at which RST1 in the pixels in row A-D becomes a low level. That is, when each row of pixels are read out, the corresponding APS readout circuit 220 makes a difference between the electrical signal at the corresponding floating diffusion node FD1 and RST1, so as to offset the generated FT/C noise and the misalignment of the charge detection amplifier (i.e., floating diffusion node FD1) when the reset of floating diffusion node FD1 is released.

In addition, in the rolling shutter exposure, the case that the first row of pixel exposure, the second row of pixel non-exposure, the third row of pixel exposure, and the fourth row of pixel non-exposure may be controlled, or every other two rows of pixel exposure may be controlled. The non-exposed row of pixels may output the EVS images. For example, for the above embodiment, the pixels in row A and the pixels in row C may be controlled to be exposed in a time-sharing manner and read in a time-sharing manner, and the pixels in row B and the pixels in row D are not exposed, so that the pixel matrix is a 2×2 matrix corresponding to the APS and a 4×4 matrix corresponding to the EVS. This approach can be applied to some applications where the output image is targeted to the region of interest, or where the amount of image information required is relatively small. Of course, in the rolling shutter exposure, the second row of pixels may not be controlled to be exposed immediately after the readout of the pixel data of the first row of pixels is finished (as shown at T1 moment in FIG. 8) (i.e., RST2 in each pixel in row B remains at a high level after T1 moment in FIG. 8), and the pixels in the second row still output the EVS images during the time difference between the readout of the pixel data of the pixels in the first row and the start of the exposure of the pixels in the second row.

Figures 9, 10:
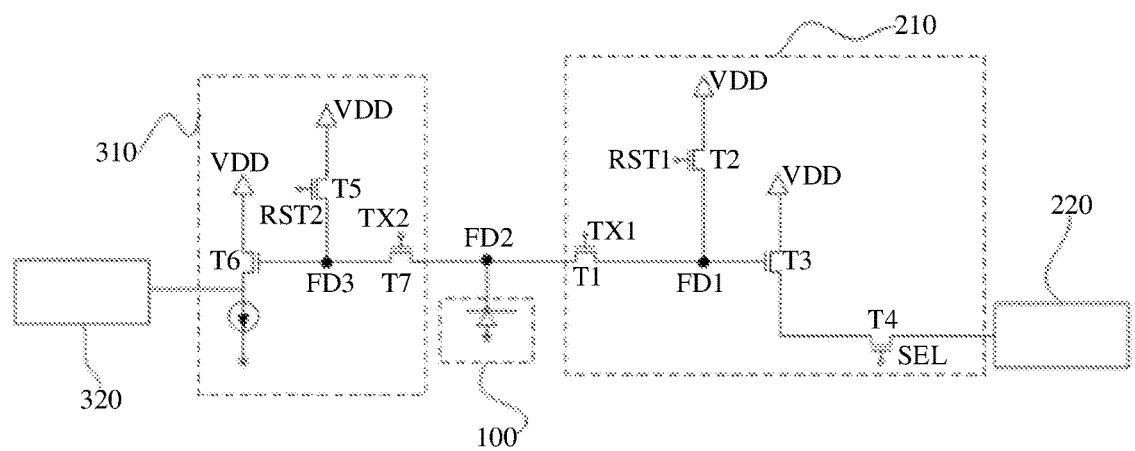
FIG. 9 is a diagram illustrating the image outputted by each transistor in the pixel in the ON/OFF state as shown in FIG. 8 according to an embodiment of the present application.
FIG. 10 is a structure diagram of a second circuit of the pixel according to an embodiment of the present application.

As another embodiment, further referring to FIG. 10, FIG. 10 is a structure diagram of a second circuit of the pixel according to an embodiment of the present application. On the basis of the above-mentioned, the EVS transmission circuit 310 may further include a second transmission branch circuit, and the second transmission branch circuit is connected to the second reset branch circuit, the second driving branch circuit, the input circuit 100 and the control circuit 400. In this embodiment, the second transmission branch circuit is configured to trigger, during the process of the first photoelectric conversion, the working state by the control signal TX2 sent by the control circuit 400. When the second transmission branch circuit is in a working state, the second transmission branch circuit is configured to transmit the photoelectric current generated by the input circuit 100 to the second reset branch circuit.

As a specific implementation of this embodiment, still referring to FIG. 10, the second transmission branch circuit may be formed by a second transmission transistor T7. That is, in the specific implementation, compared with the foregoing embodiment, the EVS transmission circuit 310 is additionally provided with one transmission transistor (i.e., the second transmission transistor T7). In this case, a source electrode of the second reset transistor T5 and a gate electrode of the second driving transistor T6 are both connected to a first end of the second transmission transistor T7. A second end of the second transmission transistor T7 is connected to the input circuit 100, and a third end of the second transmission transistor T7 is connected to the control circuit 400.

Specifically, the second transmission transistor T7 is configured to trigger an ON state according to the control signal TX2 sent by the control circuit 400 during the process of the first photoelectric conversion (if FIG. 2 is taken as an example, corresponding to A1 in FIG. 2), and during the subsequent process of the first photoelectric conversion (if FIG. 2 is taken as an example, corresponding to A2, A3 and A4 in FIG. 2), and after the selecting transistor T4 transmits the received second voltage to the APS readout circuit 220, or during the process in which the selecting transistor T4 transmits the received second voltage to the APS readout circuit 220. When the second transmission transistor T7 is in the ON state, the second transmission transistor T7 is configured to transmit the photoelectric current generated by the input circuit 100 to the second reset transistor T5.

Specifically, the second transmission transistor T7 is further configured to trigger an OFF state according to the control signal TX2 sent by the control circuit 400 while performing APS exposure. When the second transmission transistor T7 is in the OFF state, the input circuit 100 cannot transmit the photoelectric current to the second reset transistor T5 through the second transmission transistor T7.

Figure 11:
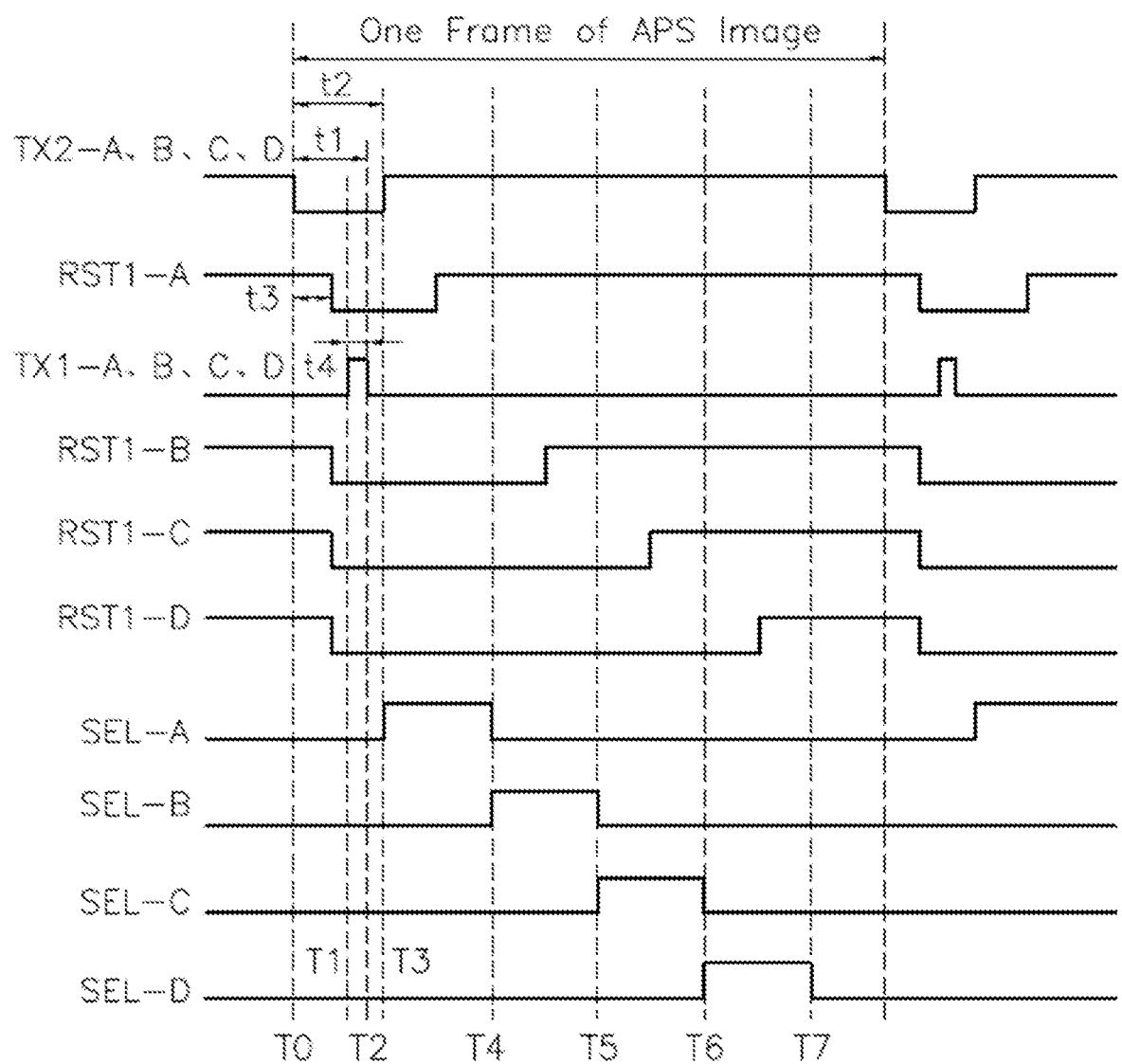
FIG. 11 is a schematic diagram of the first ON/OFF state of each transistor in the pixel when the pixel structure is as shown in FIG. 10 according to an embodiment of the present application.
Figure 12:
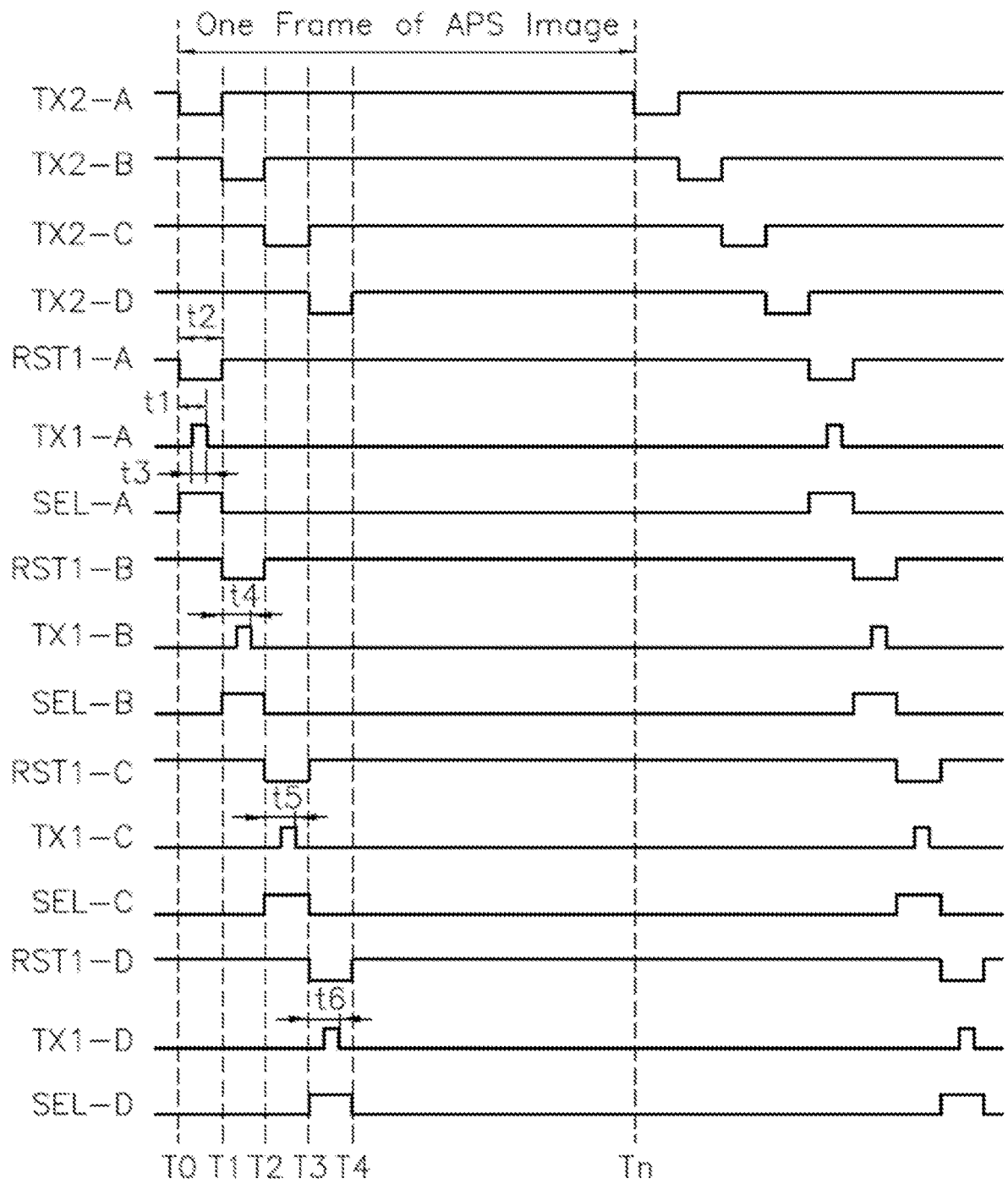
FIG. 12 is a schematic diagram of the second ON/OFF state of each transistor in the pixel when the pixel structure is as shown in FIG. 10 according to an embodiment of the present application.

It is understood that in this particular implementation, the second transmission transistor T7 plays the same role as the first transmission transistor T1 in the APS transmission circuit 210. In addition, when the exposure mode of the APS is global exposure, the on/off state of each transistor in the pixels may refer to FIG. 11. When the exposure mode of the APS is rolling shutter exposure, the on/off state of each transistor in the pixel may be seen in FIG. 12. The specific working process may be similar to that of the foregoing embodiment, and the only difference from the foregoing embodiment is that the input circuit 100 can transmit the photoelectric current to the second reset transistor T5 through the second transmission transistor T7 only when the second transmission transistor T7 is turned on.

It can be seen from the above-mentioned description of the specific implementation that, there are seven transistors in total adopted in the APS transmission circuit 210 and the EVS transmission circuit 310 in the specific implementation. In this case, the photoelectric conversion element in the input circuit 100 may adopt, but is not limited to, a photodiode and a phototransistor. In an embodiment, the photoelectric conversion element in the input circuit 100 adopts a clamping photodiode.

Figure 13:
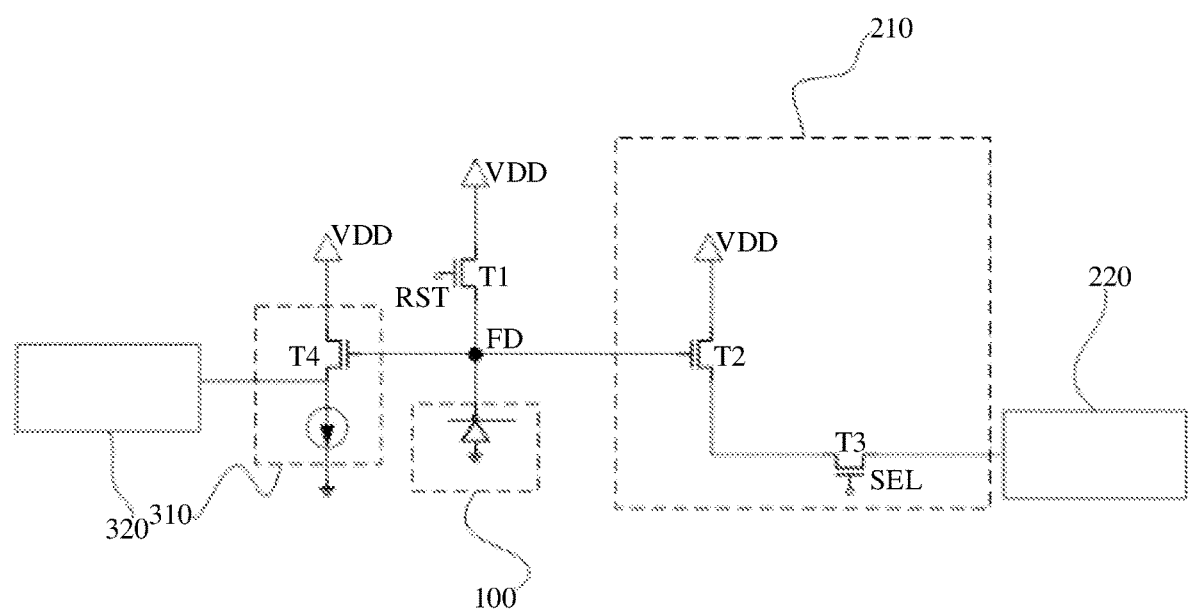
FIG. 13 is a structure diagram of a third circuit of the pixel according to an embodiment of the present application.

As another implementation, referring to FIG. 13, FIG. 13 is a structure diagram of a third circuit of the pixel according to an embodiment of the present application. The APS transmission circuit 210 may include a floating diffusion node FD, an output branch circuit and a reset branch circuit. The floating diffusion node FD is connected to the output branch circuit, the input circuit 100 and the reset branch circuit. The output branch circuit is further connected to the APS readout circuit 220. In this embodiment, the reset branch circuit is configured to trigger a non-working state by the control signal RST sent by the control circuit 400 during the subsequent process of the first photoelectric conversion. The floating diffusion node FD is configured to accumulate the photoelectric charges transmitted from the input circuit 100 and generate a corresponding second voltage during the subsequent process of the first photoelectric conversion and when the reset branch circuit is in a non-working state. The output branch circuit is configured to trigger a working state via a control signal SEL sent by the control circuit 400. When the output branch circuit is in the working state, the output branch circuit is configured to transmit the second voltage at the floating diffusion node FD to the APS readout circuit 220, so that the APS readout circuit 220 subsequently outputs a corresponding grayscale signal according to the received second voltage.

Specifically, the output branch circuit may include a first driving branch circuit and a selecting branch circuit. The selecting branch circuit is connected to the first driving branch circuit, the control circuit 400 and the APS readout circuit 220. The first driving branch circuit is further connected to the floating diffusion node FD. In this embodiment, the first driving branch circuit is configured to buffer the potential of the floating diffusion node FD and output the second voltage to the selecting branch circuit during the subsequent process of the first photoelectric conversion. The selecting branch circuit is configured to trigger a working state via a control signal SEL sent by the control circuit 400. When the selecting branch circuit is in the working state, the selecting branch circuit is configured to transmit the second voltage at the floating diffusion node FD to the APS readout circuit 220, so that the APS readout circuit 220 subsequently outputs a corresponding grayscale signal according to the received second voltage.

For this embodiment, still referring to FIG. 13, the EVS transmission circuit 310 may include a second driving branch circuit, and the second driving branch circuit is connected to the floating diffusion node FD and the EVS readout circuit 320. In this embodiment, the reset branch circuit is further configured to trigger a working state by the control signal RST sent by the control circuit 400 during the subsequent process of the first photoelectric conversion, and after the selecting branch circuit completes the transmission of the received second voltage to the APS readout circuit 220. When the reset branch circuit is in the working state, the reset branch circuit is configured to output a corresponding first voltage according to the photoelectric current generated by the input circuit 100. The second driving branch circuit is configured to transmit the first voltage to the EVS readout circuit 320, so that the EVS readout circuit 320 subsequently outputs corresponding event signals according to the difference between the received first voltage and the reference voltage.

Specifically, the reset branch circuit may include a reset transistor T1. A source electrode of the reset transistor T1 is connected to the floating diffusion node FD. A drain electrode and a gate electrode of the reset transistor T1 are both connected to the power supply VDD, and the gate electrode of the reset transistor T1 is further connected to the control circuit 400. In this embodiment, the reset transistor T1 is configured to trigger an OFF state by the control signal RST sent by the control circuit 400 during the subsequent process of the first photoelectric conversion, and is configured to trigger an ON state by the control signal RST sent by the control circuit 400 during the subsequent process of the first photoelectric conversion, and after the selecting branch circuit completes the transmission of the second voltage to the APS readout circuit 220. When the reset transistor T1 is in an ON state, the reset transistor T1 is configured to output a corresponding first voltage according to the photoelectric current generated by the input circuit 100. The photoelectric current is equal to the current between the drain electrode and the source electrode of the reset transistor T1, the first voltage is equal to the voltage between the drain electrode and the source electrode of the reset transistor T1, and there is a logarithm relationship between the photoelectric current and the first voltage.

As a specific implementation of this embodiment, still referring to FIG. 13, in the APS transmission circuit 210, except that the reset branch circuit is formed by the reset transistor T1, other branch circuits may also be formed by corresponding transistors. For example, the first driving branch circuit includes the first driving transistor T2, and the selecting branch circuit includes the selecting transistor T3. Accordingly, in the EVS transmission circuit 310, the second driving branch circuit may also be formed by a corresponding transistor. For example, the second driving branch circuit includes a second driving transistor T4.

In the specific implementation, the APS transmission circuit 210 may include a reset transistor T1, a first driving transistor T2, a selecting transistor T3 and a floating diffusion node FD. The input circuit 100, the EVS transmission circuit 310, the source electrode of the reset transistor T1 and the gate electrode of the first driving transistor T2 are all connected to the floating diffusion node FD. The drain electrode of the first driving transistor T2, the drain electrode of the reset transistor T1, and the gate electrode of the first driving transistor T2 are all connected to the power supply VDD. The gate electrode of the reset transistor T1 is further connected to the control circuit 400. The source electrode of the first driving transistor T2 is connected to the drain electrode of the selecting transistor T3. The source electrode of the selecting transistor T3 is connected to the APS readout circuit 220, and the gate electrode thereof is connected to the control circuit 400. It can be understood that, when the drain electrode and the gate of the reset transistor T1 are both connected to the power supply VDD, a drain-source voltage and a drain-source current may be formed between the drain electrode and the source electrode of the reset transistor T1, and there is logarithm relationship between the formed drain-source voltage and drain-source current.

Specifically, the reset transistor T1 is configured to firstly trigger the OFF state according to the control signal RST sent by the control circuit 400 during the subsequent process of the first photoelectric conversion.

Specifically, the floating diffusion node FD is configured to accumulate the photoelectric charges generated by the input circuit 100 to form a corresponding second voltage during the subsequent process of the first photoelectric conversion and when the reset transistor T1 is in the OFF state. Here, it is necessary to explain that the floating diffusion node FD is equivalent to a charge detection amplifier in this specific implementation.

Specifically, the first driving transistor T2 is configured to transmit the second voltage formed by the floating diffusion node FD to the selecting transistor T3 during the subsequent process of the first photoelectric conversion. Here, it is necessary to clarify that the first driving transistor T2 is equivalent to a source follower amplifier in this specific implementation, which can buffer the potential at the floating diffusion node FD, so as to be able to output to the selector transistor T3 to output a voltage consistent with the second voltage.

Specifically, the selecting transistor T3 is configured to trigger an ON state according to the control signal SEL sent by the control circuit 400 during the subsequent process of the first photoelectric conversion. When the selecting transistor T3 is in the ON state, the selecting transistor T3 can transmit the received second voltage to the APS readout circuit 220, so that the APS readout circuit 220 subsequently outputs the corresponding grayscale signal according to the received second voltage. Accordingly, the selecting transistor T3 is further configured to trigger an OFF state according to the control signal SEL sent by the control circuit 400 during the subsequent process of the first photoelectric conversion and after the selecting transistor T3 completes the transmission of the received second voltage to the APS readout circuit 220. When the selecting transistor T3 is in the OFF state, the selecting transistor T3 cannot transmit the received second voltage to the APS readout circuit 220.

For this specific implementation, still referring to FIG. 13, the EVS transmission circuit 310 may include a second driving transistor T4. A gate electrode of the second driving transistor T4 is connected to the floating diffusion node FD. A source electrode is connected to the EVS readout circuit 320, and a drain electrode of the second driving transistor T4 is configured to be connected to the power supply VDD.

Specifically, the reset transistor T1 is further configured to trigger an ON state according to the control signal RST sent by the control circuit 400 during a process of the first photoelectric conversion (corresponding to A1 in FIG. 2 if FIG. 2 is taken as an example), and during the subsequent process of the first photoelectric conversion (corresponding to A2, A3 and A4 in FIG. 2 if FIG. 2 is taken as an example), and after the selecting transistor T3 completes the transmission of the received second voltage to the APS readout circuit 220. When the reset transistor T1 is in the ON state, it is configured to output a corresponding first voltage to the second driving transistor T4 according to the photoelectric current transmitted from the input circuit 100. The photoelectric current is equal to a current between the drain electrode and the source electrode of the reset transistor T1 (i.e., the drain-source current). The first voltage is equal to the voltage between the drain electrode of the reset transistor T1 and the source electrode of the reset transistor T1 (i.e., the drain-source voltage), and there is a logarithm relationship between the photoelectric current and the first voltage. It can be understood that when the reset transistor T1 is in the OFF state, it cannot output the first voltage to the second driving transistor T4.

Specifically, the second driving transistor T4 is configured to transmit the received first voltage to the EVS readout circuit 320 so that the EVS readout circuit 320 subsequently outputs a corresponding event signal based on the difference between the received first voltage and the reference voltage. Here, it is necessary to clarify that the second driving transistor T4 is equivalent to a voltage buffer in this specific implementation, so as to be able to output a voltage consistent with the first voltage to the EVS readout circuit 320.

In this specific implementation, the APS transmission circuit 210 and the EVS transmission circuit 310 in a single pixel share the same reset transistor T1, which makes the size of a single pixel even smaller and thus enables an overall size of the image sensor to be further reduced. Moreover, the APS transmission circuit 210 and the EVS transmission circuit 310 in this specific implementation adopt four transistors in total. In such cases, the photoelectric conversion elements in the input circuit 100 may adopt, but are not limited to, photodiodes and phototransistors.

Figure 14:
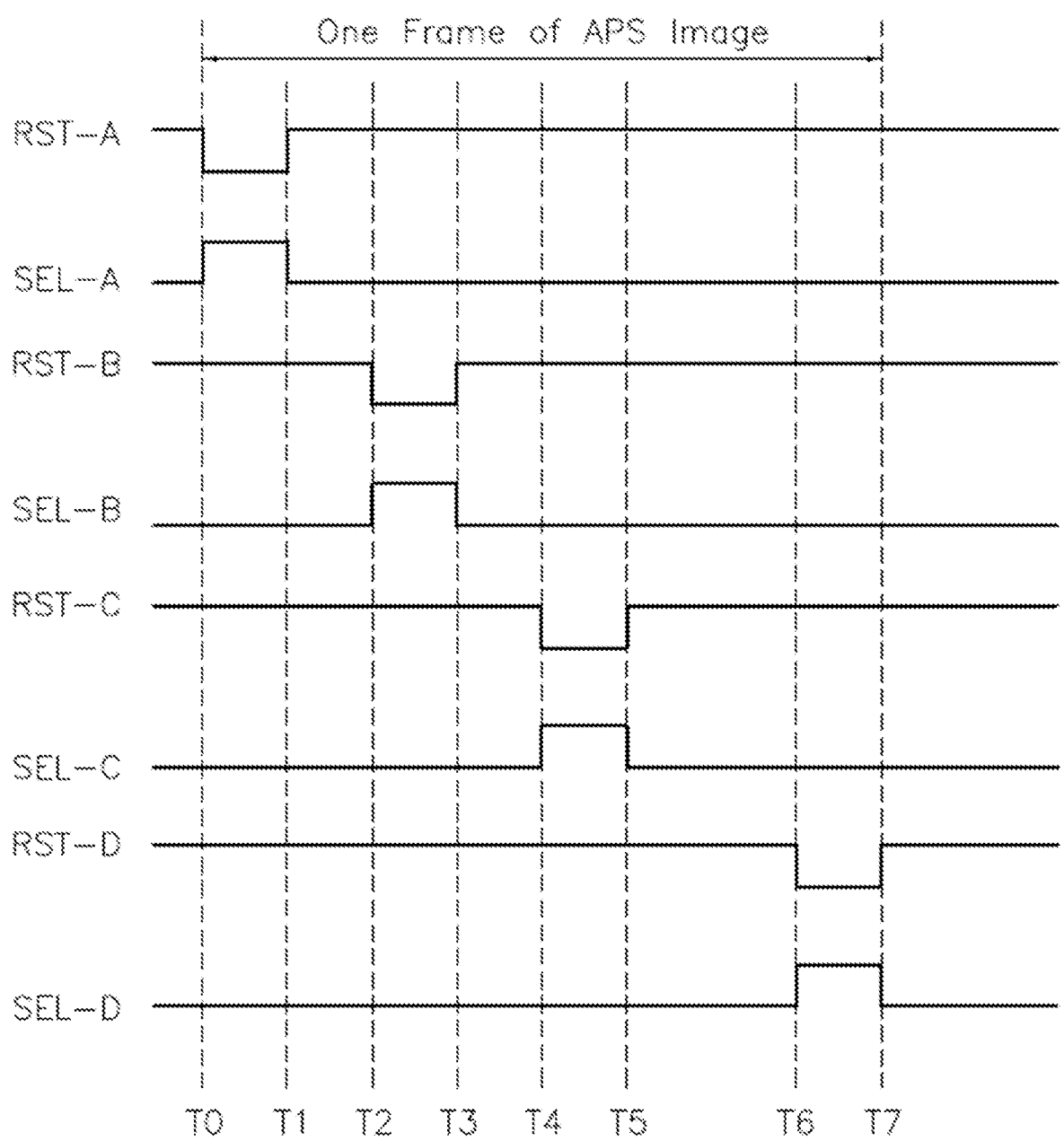
FIG. 14 is a diagram illustrating the ON/OFF state of each transistor in the pixel when the pixel structure is as shown in FIG. 13 according to an embodiment of the present application.

In order to clearly understand this specific implementation, the implementation is described in detail as follows with an example of the pixel array as shown in FIG. 5. When the exposure method of the APS is the rolling shutter exposure, further referring to FIG. 14, which is a diagram illustrating the ON/OFF state of each transistor in the pixel when the pixel structure is as shown in FIG. 13 according to an embodiment of the present application. Before T0 moment, the pixels are performing the output of the EVS images, and the control circuit 400 controls the RST in each pixel in rows A-D to be a high level and controls the gate electrode and the drain electrode of the reset transistor T1 to be connected in a short circuit manner. At this time, the input circuit 100 is configured to perform the first photoelectric conversion on the incident light to generate the corresponding photoelectric current. At T0 moment, the control circuit 400 controls the RST in each pixel in row A to be at a low level, and the first driving transistor T2 transmits the second voltage formed by the photoelectric charges at the floating diffusion node FD to the selecting transistor T3. The control circuit 100 controls the RST in each pixel in row A to be at a high level, so that the selecting transistor T3 in each pixel in row A is at the ON state, i.e., A11, A12, A13, and A14 in the pixels in row A are selected, and the pixel data of A11, A12, A13, and A14 in the pixels in row A is read out via four APS readout circuits 220 (i.e., a, b, c, and d). At T1 moment, the control circuit 400 controls the RST in each pixel in row A to be at a high level, causing the pixel in row A to perform the output of EVS images. Here, it is necessary to clarify that the four APS readout circuits 220 (i.e., a, b, c, and d) need to read out the pixels in row A before the rising edge of the RST.

Likewise, at a period of T1-T2, according to the above-mentioned process, B11, B12, B13 and B14 in the pixels in row B may be selected, and the pixel data of B11, B12, B13 and B14 in the pixels in row B may be read via the four APS readout circuits 220 (i.e., a, b, c and d). At a period of T2-T3, according to the above-mentioned process, C11, C12, C13 and C14 in the pixels in row C may be selected, and the pixel data of C11, C12, C13 and C14 in the pixels in row C is read out via four APS readout circuits 220 (i.e., a, b, c and d). At a period of T3-T4, according to the above-mentioned process, D11, D12, D13 and D14 in the pixels in row D may be selected, and the pixel data of D11, D12, D13, and D14 in the pixels in row D are read out via four APS readout circuits 220 (i.e., a, b, c and d).

It should be understood that the several embodiments described in the preceding paragraphs are only preferred implementations of the embodiments of the present application and are not the only limitations of the embodiments of the present application on the specific composition of individual pixels. In this regard, those skilled in the art may set them flexibly based on the embodiments of the present application and the practical application scenario.

Figure 15:
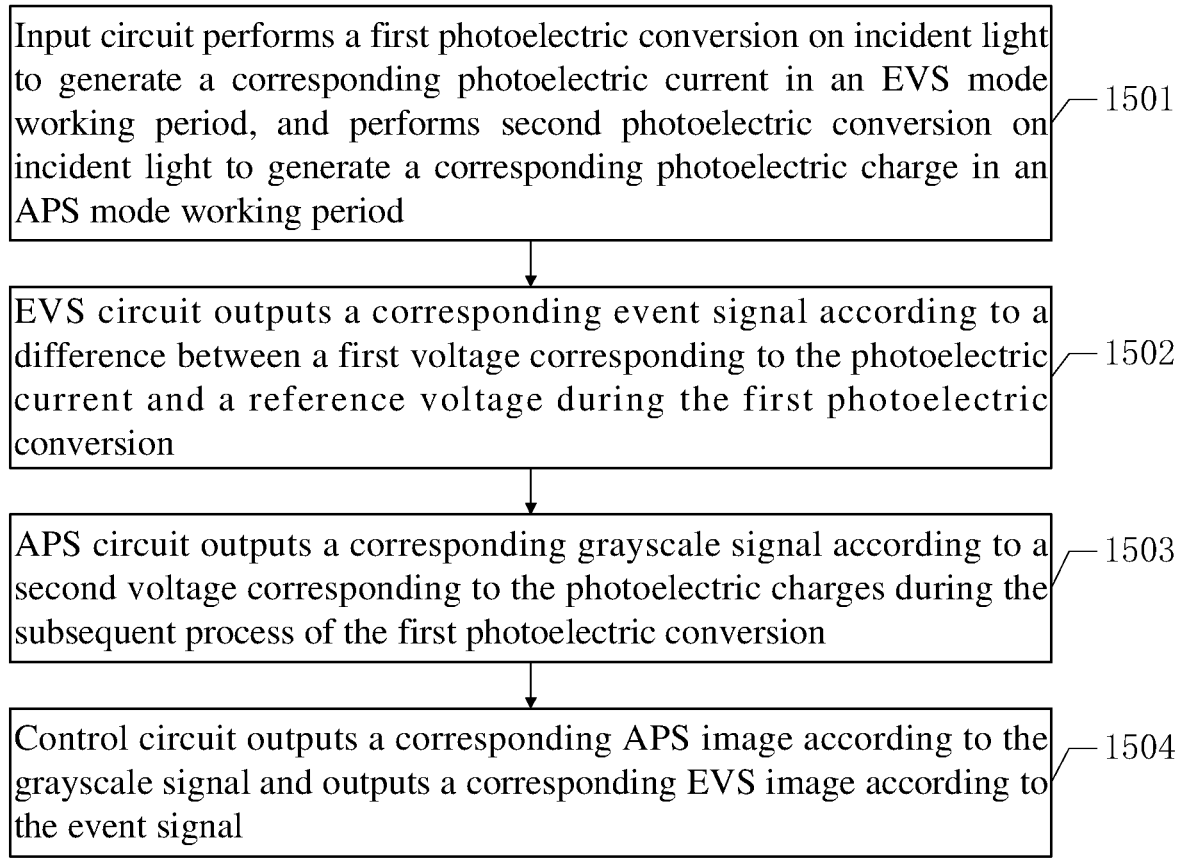
FIG. 15 is a diagram illustrating an image output method according to an embodiment of the present application.

Referring to FIG. 15, FIG. 15 is a diagram illustrating an image output method according to an embodiment of the present application. An embodiment of the present application further provides an image output method, which is applied to the image sensor provided by the embodiment of the present application, and the image output method includes steps 1501-1504 as follows.

Step 1501: an input circuit performs a first photoelectric conversion on incident light to generate a corresponding photoelectric current in an EVS mode working period, and performs a second photoelectric conversion on incident light to generate corresponding photoelectric charges in an APS mode working period.

In this embodiment of the present application, the input circuit 100 includes a photoelectric conversion element, which is configured to perform photoelectric conversion of incident light. That is, in an operating period of an EVS mode, the input circuit 100 performs the first photoelectric conversion on the incident light to generate a corresponding photoelectric current, and in the EVS mode working period, the input circuit 100 performs the second photoelectric conversion on the incident light to generate the corresponding photoelectric charges. The first photoelectric conversion is the EVS exposure, and the second photoelectric conversion is the APS exposure. It can be seen therefrom that a part of period (i.e., the APS mode working period) from the EVS exposure process is divided up to perform the APS exposure, i.e., the EVS exposure and the APS exposure are performed alternately. For example, taking A1, B1 and A2 in FIG. 2 as an example, a part of period (i.e., B1) in an EVS exposure process (i.e., a subsequent period between A1 and A2) is divided up to perform the APS exposure.

Step 1502: The EVS circuit outputs a corresponding event signal according to a difference between a first voltage corresponding to the photoelectric current and a reference voltage during the process of the first photoelectric conversion.

In the embodiment of the present application, during the process of the first photoelectric conversion, the EVS circuit 300 outputs the corresponding event signal according to the difference between the first voltage corresponding to the photoelectric current and the reference voltage. The event signal is configured to generate corresponding EVS images. In a practical application, if a pixel is outputting an EVS image, the input circuit 100 performs the first photoelectric conversion on the incident light, and outputs a corresponding photoelectric current to the EVS circuit 300. Thereafter, the EVS circuit 300 outputs a corresponding event signal according to a difference between a first voltage corresponding to the received photoelectric current and a reference voltage, so as to subsequently generate a corresponding EVS image using the output event signal. Here, it is necessary to explain that the difference between the first voltage and the reference voltage is used to indicate a change (i.e., increase, decrease, or do not change) in the intensity of the incident light, which means that the EVS circuit 300 actually outputs corresponding event signals according to changes in the intensity of the incident light. For example, the change in the intensity of the incident light is determined by whether the difference between the first voltage and the reference voltage is greater than 0, less than 0, or equal to 0.

Step 1503: the APS circuit outputs a corresponding grayscale signal according to a second voltage corresponding to the photoelectric charges during the subsequent process of the first photoelectric conversion.

In the embodiment of the present application, during the subsequent process of the first photoelectric conversion (i.e., during the process of the next first photoelectric conversion after the completion of the second photoelectric conversion, or during the next EVS mode working period adjacent to the APS mode working period), the APS circuit 200 outputs the corresponding grayscale signal according to the second voltage corresponding to the photoelectric charges. The grayscale signals are configured to generate the corresponding APS images. For example, taking A1, B1 and A2 in FIG. 2 as an example, the input circuit 100 may perform the second photoelectric conversion on the incident light in B1 to generate the corresponding photoelectric charges, and the APS circuit 200 may output a corresponding grayscale signal in A2 according to a second voltage corresponding to the generated photoelectric charges. It can be understood that the process of outputting the grayscale signals by the APS circuit 200 is actually a readout process of the APS, and the process of outputting the grayscale signals by the APS circuit 200 is performed within a next EVS mode working period (e.g., A2) adjacent to the APS mode working period (e.g., B1). However, in A2, the EVS operation may still continue to be performed, that is, the readout process of the APS does not affect the exposure and readout of the EVS, which enables a single pixel to output an APS image and an EVS image simultaneously when the single pixel includes both the APS pixel and the EVS pixel.

Step 1504: the control circuit outputs a corresponding APS image according to the grayscale signal and outputs a corresponding EVS image according to the event signal.

In the embodiments of the present application, the control circuit 400 outputs the corresponding APS image according to the grayscale signal and outputs the corresponding EVS image according to the event signal. In a practical application, if the pixel is outputting an APS image, the APS circuit 200 outputs a corresponding grayscale signal to the control circuit 400 according to the received second voltage corresponding to the photoelectric charges. Then, the control circuit 400 outputs the corresponding APS image according to the received grayscale signal for displaying to the user. Likewise, if the pixel is performing the output of the EVS image, then the EVS circuit 300 outputs a corresponding event signal to the control circuit 400 according to the difference between the first voltage corresponding to the received photoelectric current and the reference voltage. Thereafter, the control circuit 400 outputs a corresponding EVS image according to the received event signal for displaying to a user.

The steps of a method or algorithm described in connection with the embodiments disclosed herein may be embodied directly in hardware, in a software module executed by a processor, or in a combination of the two. The software module may be placed in a random access memory (RAM), a memory, a read-only memory (ROM), an electrically programmable ROM, an electrically erasable programmable ROM, a register, a hard disk, a removable magnetic disk, a CD-ROM, or any other form of storage medium known in the art.

The above-mentioned embodiments may be implemented in whole or in part by software, hardware, firmware, or any combination thereof. When implemented using software, it may be implemented in whole or in part in the form of a computer program product, and the computer program product includes one or more computer instructions. When the computer program instructions are loaded and executed on the computer, the processes or functions described in the present application are totally or partially generated. The computer may be a general-purpose computer, a special-purpose computer, a computer network, or other programmable apparatus. The computer instructions may be stored in a computer-readable storage medium or transmitted from one computer-readable storage medium to another. For example, computer instructions may be transmitted from one website, computer, server, or data center to another website, computer, server, or data center in a wired (e.g., coaxial cable, fiber, digital subscriber line) or wireless (e.g., infrared, wireless, microwave) mode. The computer-readable storage medium may be any available media that can be accessed by a computer or a data storage device such as a server, or a data center including one or more of the available media arrays. The usable medium may be a magnetic medium, (e.g., floppy disk, hard disk, magnetic tape), an optical medium (e.g., DVD), a semiconductor medium (e.g., Solid State Disk), or the like.

It should be noted that, each embodiment in the content of the present application is described in a progressive manner, and each embodiment focuses on a difference from other embodiments, so that reference may be made to the same or similar parts among the embodiments. Since the product-type embodiments are similar to the method-type embodiments, the description of the method-type embodiments is relatively simple, and reference may be made to the description of the method-type embodiments for related parts.

It should also be noted that, in the present application, relational terms such as first and second are only used to distinguish one entity or operation from another entity or operation, and do not necessarily require or imply any practical relationship or sequence between these entities or operations. Furthermore, the terms "include", "comprise", or any other variant thereof are intended to cover a non-exclusive inclusion, so that a process, a method, an article, or a device that includes a series of elements not only includes those elements, but also includes other elements that are not explicitly listed, or further includes elements inherent to the process, the method, the article, or the device. An element limited by "including a . . . " does not exclude other same elements existing in a process, a method, an article, or a device that includes the element, unless otherwise specified.

The above-mentioned description of the disclosed embodiments enables those skilled in the art to implement or use the contents of the present application. Various modifications to these embodiments will be readily apparent to those skilled in the art. The general principles defined in this disclosure may be implemented in other embodiments without departing from the spirit or scope of this disclosure. Therefore, the contents of the present application are not limited to the embodiments shown in the contents of the present application, but should be accorded the widest scope consistent with the principles and novel features disclosed in the contents of the present application.

What is claimed is:

1. An image sensor, having a pixel array comprising a plurality of pixels, comprising:
   an input circuit;
   an Active Pixel Sensor (APS) circuit;
   an Event-Based Vision Sensor (EVS) circuit; and
   a control circuit;
   wherein each of the pixels comprises the APS circuit and the EVS circuit; the input circuit is connected to the APS circuit and the EVS circuit, and the control circuit is connected to the APS circuit and the EVS circuit; wherein a working period unit of the input circuit is a working period of outputting a frame of an APS image; the working period unit comprises an EVS mode working period and an APS mode working period, and the APS mode working period is provided between two adjacent EVS mode working periods;
   the input circuit is configured to perform a first photoelectric conversion on incident light to generate a corresponding photoelectric current during the EVS mode working period, and perform a second photoelectric conversion on the incident light to generate corresponding photoelectric charges during the APS mode working period;
   the EVS circuit is configured to output a corresponding event signal according to a difference between a first voltage corresponding to the photoelectric current and a reference voltage during a process of the first photoelectric conversion;
   the APS circuit is configured to output a corresponding grayscale signal according to a second voltage corresponding to the photoelectric charges during a subsequent process of the first photoelectric conversion; and
   the control circuit is configured to output a corresponding EVS image according to the event signal, and output a corresponding APS image according to the grayscale signal.

2. The image sensor of claim 1, wherein the EVS circuit comprises an EVS transmission circuit and an EVS readout circuit, wherein the EVS transmission circuit is connected to the input circuit and the EVS readout circuit, and the control circuit is connected to the EVS transmission circuit and the EVS readout circuit;
   the EVS transmission circuit is configured to output the corresponding first voltage according to the photoelectric current during the process of the first photoelectric conversion; and
   the EVS readout circuit is configured to output the corresponding event signal according to the difference between the first voltage and the reference voltage.

3. The image sensor of claim 2, wherein the EVS transmission circuit comprises a reset branch circuit and a driving branch circuit, wherein the reset branch circuit and the driving branch circuit are both connected to the input circuit; the reset branch circuit is further connected to the control circuit, and the driving branch circuit is further connected to the EVS readout circuit;
   the reset branch circuit is configured to trigger a working state via a first control signal sent by the control circuit during the process of the first photoelectric conversion, and output the corresponding first voltage according to the photoelectric current when the reset branch circuit is in the working state; and
   the driving branch circuit is configured to transmit the first voltage to the EVS readout circuit.

4. The image sensor of claim 3, wherein the reset branch circuit comprises a reset transistor, wherein a drain electrode and a gate electrode of the reset transistor are configured to be connected to a power supply; a source electrode of the reset transistor and the driving branch circuit are both connected to the input circuit, and the gate electrode of the reset transistor is further connected to the control circuit;
   the reset transistor is configured to trigger an ON state via the first control signal sent by the control circuit during the process of the first photoelectric conversion process, and output the corresponding first voltage according to the photoelectric current; wherein the photoelectric current is equal to a current between the drain electrode and the source electrode of the reset transistor; the first voltage is equal to a voltage between the source electrode and the source electrode of the reset transistor, and there is a logarithm relationship between the photoelectric current and the first voltage.

5. The image sensor of claim 3, wherein the EVS transmission circuit further comprises a transmission branch circuit, and the transmission branch circuit is connected to the reset branch circuit, the driving branch circuit, the input circuit and the control circuit;
the transmission branch circuit is configured to trigger a working state via a second control signal sent by the control circuit during the process of the first photoelectric conversion, and transmit the photoelectric current to the reset branch circuit when the transmission branch circuit is in the working state.

6. The image sensor of claim 2, wherein the APS circuit comprises an APS transmission circuit and an APS readout circuit, wherein the APS transmission circuit is connected to the input circuit and the APS readout circuit, and the control circuit is connected to the APS transmission circuit and the APS readout circuit;
the APS transmission circuit is configured to output the corresponding second voltage according to the photoelectric charges during the subsequent process of the first photoelectric conversion; and
the APS readout circuit is configured to output the corresponding grayscale signal according to the second voltage.

7. The image sensor of claim 6, wherein the APS transmission circuit comprises a transmission branch circuit, a floating diffusion node and an output branch circuit, wherein the transmission branch circuit is connected to the input circuit, the control circuit and the floating diffusion node, and the output branch circuit is connected to the floating diffusion node, the control circuit and the APS readout circuit;
the transmission branch circuit is configured to trigger a working state via a first control signal sent by the control circuit during the subsequent process of the first photoelectric conversion, and transmit the photoelectric charges to the floating diffusion node when the transmission branch circuit is in the working state;
the floating diffusion node is configured to accumulate the photoelectric charges and generate the corresponding second voltage; and
the output branch circuit is configured to trigger a working state via a second control signal sent by the control circuit, and transmit the second voltage to the APS readout circuit when the output branch circuit is in the working state.

8. The image sensor of claim 7, wherein the output branch circuit comprises a driving branch circuit and a selecting branch circuit, wherein the selecting branch circuit is connected to the driving branch circuit, the control circuit and the APS readout circuit, and the driving branch circuit is further connected to the floating diffusion node;
the driving branch circuit is configured to buffer a potential of the floating diffusion node, and output the second voltage to the selecting branch circuit; and
the selecting branch circuit is configured to trigger a working state via a second control signal sent by the control circuit, and transmit the second voltage to the APS readout circuit when the selecting branch circuit is in the working state.

9. The image sensor of claim 7, wherein the APS transmission circuit further comprises a reset branch circuit, and the reset branch circuit is connected to the floating diffusion node and the control circuit;
the reset branch circuit is configured to trigger a working state via a third control signal sent by the control circuit after completing a transmission of the second voltage to the APS readout circuit, wherein the photoelectric charges accumulated in the floating diffusion node move outward when the reset branch circuit is in the working state.

10. The image sensor of claim 9, wherein the reset branch circuit comprises a reset transistor, wherein a source electrode of the reset transistor is connected to the floating diffusion node, a gate electrode of the reset transistor is connected to the control circuit, and a drain electrode of the reset transistor is connected to a power supply;
the reset transistor is configured to trigger an ON state via the third control signal sent by the control circuit after completing the transmission of the second voltage to the APS readout circuit, wherein the photoelectric charges accumulated in the floating diffusion node move to the power supply when the reset transistor is in the ON state.

11. The image sensor of claim 6, wherein the APS transmission circuit comprises a floating diffusion node, an output branch circuit and a reset branch circuit, wherein the floating diffusion node is connected to the output branch circuit, the input circuit and the reset branch circuit, and the output branch circuit is further connected to the APS readout circuit;
the reset branch circuit is configured to trigger a non-working state via a first control signal sent by the control circuit during the process of the first photoelectric conversion;
the floating diffusion node is configured to accumulate the photoelectric charges and generate the corresponding second voltage when the reset branch circuit is in the non-working state;
the output branch circuit is configured to trigger a working state via a second control signal sent by the control circuit, and transmit the second voltage to the APS readout circuit when the output branch circuit is in the working state.

12. The image sensor of claim 11, wherein the output branch circuit comprises a first driving branch circuit and a selecting branch circuit, wherein the selecting branch circuit is connected to the first driving branch circuit, the control circuit and the APS readout circuit, and the first driving branch circuit is further connected to the floating diffusion node;
the first driving branch circuit is configured to buffer a potential of the floating diffusion node, and output the second voltage to the selecting branch circuit; and
the selecting branch circuit is configured to trigger a working state via the second control signal sent by the control circuit, and transmit the second voltage to the APS readout circuit when the selecting branch circuit is in the working state.

13. The image sensor of claim 11, wherein the EVS transmission circuit comprises a second driving branch circuit, wherein the second driving branch circuit is connected to the floating diffusion node and the EVS readout circuit;
the reset branch circuit is further configured to trigger a working state via the first control signal sent by the control circuit after completing a transmission of the second voltage to the APS readout circuit, and output the corresponding first voltage according to the photoelectric current when the reset branch circuit is in the working state; and the second driving branch circuit is configured to transmit the first voltage to the EVS readout circuit.

14. The image sensor of claim 13, wherein the reset branch circuit comprises a reset transistor, wherein a source electrode of the reset transistor is connected to the floating diffusion node; a drain electrode and a gate electrode of the reset transistor are both connected to a power supply, and the gate electrode is further connected to the control circuit;

the reset transistor is configured to trigger an ON state via the first control signal sent by the control circuit after completing the transmission of the second voltage to the APS readout circuit, and output the corresponding first voltage according to the photoelectric current when the reset transistor is in the ON state; wherein the photoelectric current is equal to a current between the drain electrode and the source electrode of the reset transistor; the first voltage is equal to a voltage between the drain electrode and the source electrode of the reset transistor, and there is a logarithm relationship between the photoelectric current and the first voltage.

15. The image sensor of claim 6, wherein all of the pixels in the same array unit in the pixel array share the same APS readout circuit;

or, all of the pixels in the pixel array share the same APS readout circuit;

or, each of the pixels in the pixel array comprise one of the APS readout circuits.

16. The image sensor of claim 2, wherein all of the pixels in the same array unit in the pixel array share the same EVS readout circuit;

or, all of the pixels in the pixel array share the same EVS readout circuit;

or, each of the pixels in the pixel array comprise one of the EVS readout circuits.

17. The image sensor of claim 1, wherein all of the pixels in the same array unit in the pixel array share the same control circuit;

or, all of the pixels in the pixel array share the same control circuit;

or, each of the pixels in the pixel array comprise one of the control circuits.

18. The image sensor of claim 1, wherein all of the pixels in the same array unit in the pixel array share the same input circuit;

or, all of the pixels in the pixel array share the same input circuit;

or, each of the pixels in the pixel array comprise one of the input circuits.

19. An image output method, applied to an image sensor having a pixel array comprising a plurality of pixels and comprising an input circuit, an APS circuit, an EVS circuit and a control circuit, wherein each pixel comprises the APS circuit and the EVS circuit; the input circuit is connected to the APS circuit and the EVS circuit, and the control circuit is connected to the APS circuit and the EVS circuit; wherein a working period unit of the input circuit is a working period of outputting one frame of APS image, the working period unit comprises an EVS mode working period and an APS mode working period, and the APS mode working period is provided between two adjacent EVS mode working periods;

the image output method comprising:

performing, by the input circuit, a first photoelectric conversion on incident light to generate a corresponding photoelectric current during the EVS mode working period, and performing, by the input circuit, a second photoelectric conversion on the incident light to generate corresponding photoelectric charges;

outputting, by the EVS circuit, a corresponding event signal according to a difference between a first voltage corresponding to the photoelectric current and a reference voltage during a process of the first photoelectric conversion;

outputting, by the APS circuit, a corresponding grayscale signal according to a second voltage corresponding to the photoelectric charges during the process of the first photoelectric conversion; and outputting, by the control circuit, a corresponding EVS image according to the event signal, and outputting, by the control circuit, a corresponding APS image according to the grayscale signal.

20. An application of the image sensor of claim 1 in a photoelectric device.

* * * * *